US011493746B2

(12) United States Patent
Stoppe et al.

(10) Patent No.: US 11,493,746 B2
(45) Date of Patent: Nov. 8, 2022

(54) ILLUMINATION MODULE FOR ANGLE-SELECTIVE ILLUMINATION

(71) Applicant: Carl Zeiss Microscopy GmbH, Jena (DE)

(72) Inventors: Lars Stoppe, Jena (DE); Michael Goegler, Wolfratshausen (DE); Thomas Ohrt, Golmsdorf (DE)

(73) Assignee: Carl Zeiss Microscopy GmbH, Jena (DE)

( * ) Notice: Subject to any disclaimer, the term of this patent is extended or adjusted under 35 U.S.C. 154(b) by 995 days.

(21) Appl. No.: 16/098,532

(22) PCT Filed: Apr. 11, 2017

(86) PCT No.: PCT/EP2017/058615
§ 371 (c)(1),
(2) Date: Nov. 2, 2018

(87) PCT Pub. No.: WO2017/190919
PCT Pub. Date: Nov. 9, 2017

(65) Prior Publication Data
US 2021/0239954 A1    Aug. 5, 2021

(30) Foreign Application Priority Data

May 2, 2016   (DE) .......................... 102016108119.1
Sep. 1, 2016   (DE) .......................... 102016116309.0

(51) Int. Cl.
*G02B 21/36*   (2006.01)
*G02B 21/08*   (2006.01)
(Continued)

(52) U.S. Cl.
CPC ....... *G02B 21/367* (2013.01); *G01N 21/6402* (2013.01); *G01N 21/6458* (2013.01);
(Continued)

(58) Field of Classification Search
CPC .............. G02B 21/0032; G02B 21/008; G02B 21/084; G02B 21/086; G02B 21/088;
(Continued)

(56) References Cited

U.S. PATENT DOCUMENTS 6,167,173 A     12/2000  Schoeppe et al.
9,625,370 B2 *  4/2017   Bawolek .............. G02B 21/088
(Continued)

FOREIGN PATENT DOCUMENTS

DE   3906555 A1    7/1989
DE   19702753 A1   7/1998
(Continued)

OTHER PUBLICATIONS

2nd Chinese Office Action dated May 8, 2021 for Chinese Issue Serial No. 2021050100602570 with Translation.
(Continued)

*Primary Examiner* — Mustak Choudhury
(74) *Attorney, Agent, or Firm* — Duane Morris LLP

(57) ABSTRACT

An optical apparatus having an illumination module with a carrier, which has at least one light-transmissive region, for example. The illumination module has a plurality of light sources, which are arranged on the carrier.

6 Claims, 19 Drawing Sheets

(51) Int. Cl.
    *G02B 21/14*    (2006.01)
    *G02B 27/58*    (2006.01)
    *G01N 21/64*    (2006.01)
    *G02B 21/00*    (2006.01)
    *G02B 21/16*    (2006.01)
    *G06T 5/50*     (2006.01)
    *G06T 7/55*     (2017.01)
    *G06T 7/70*     (2017.01)
    *G02B 21/26*    (2006.01)

(52) U.S. Cl.
    CPC ........ *G02B 21/008* (2013.01); *G02B 21/0032* (2013.01); *G02B 21/084* (2013.01); *G02B 21/086* (2013.01); *G02B 21/088* (2013.01); *G02B 21/14* (2013.01); *G02B 21/16* (2013.01); *G02B 21/26* (2013.01); *G02B 27/58* (2013.01); *G06T 5/50* (2013.01); *G06T 7/55* (2017.01); *G06T 7/70* (2017.01); *G01N 2201/06113* (2013.01); *G06T 2207/10056* (2013.01); *G06T 2207/10152* (2013.01)

(58) Field of Classification Search
    CPC ........ G02B 21/14; G02B 21/16; G02B 21/26; G02B 27/58; G02B 21/367; G01N 21/6402; G01N 21/6458; G01N 2201/06113; G06T 5/50; G06T 7/55; G06T 7/70; G06T 2207/10056; G06T 2207/10064; G06T 2207/10152; G06T 2207/20221
    See application file for complete search history.

(56) References Cited

U.S. PATENT DOCUMENTS

| | | | |
|---|---|---|---|
| 2003/0067774 | A1 | 4/2003 | Ljzotte |
| 2004/0141176 | A1 | 7/2004 | Baldwin et al. |
| 2007/0211460 | A1 | 9/2007 | Ravkin |
| 2008/0062424 | A1 | 3/2008 | Shires et al. |
| 2009/0012378 | A1* | 1/2009 | Ince .................. A61B 5/14556 600/322 |
| 2011/0285988 | A1* | 11/2011 | Menachem .......... G01N 21/956 315/258 |
| 2011/0309241 | A1 | 12/2011 | Tanase et al. |
| 2015/0293339 | A1 | 10/2015 | Schuman et al. |

FOREIGN PATENT DOCUMENTS

| | | |
|---|---|---|
| DE | 102004029057 A1 | 1/2006 |
| DE | 202006013464 U1 | 12/2006 |
| DE | 102014112242 A1 | 3/2016 |
| EP | 1698927 A1 | 9/2006 |

OTHER PUBLICATIONS

Chinese Office Action dated Nov. 24, 2021 for Chinese Application Serial No. 201780027175.3 with Translation.
European Office Action dated Mar. 28, 2022 for EP 17 716 540.4.

* cited by examiner

ILLUMINATION MODULE FOR ANGLE-SELECTIVE ILLUMINATION

RELATED APPLICATIONS

The present application is a U.S. National Stage application of International PCT Application No. PCT/EP2017/058615 filed on Apr. 11, 2017 which claims priority benefit of German Application No. DE 10 2016 108 119.1 filed on May 2, 2016 and German Application No, DE 10 2016 116 309.0 filed on Sep. 1, 2016, the contents of each are hereby incorporated by reference in their entirety.

FIELD OF THE INVENTION

Various embodiments of the invention relate to a laser scanning microscope and a microscope. In various embodiments, an illumination module for a corresponding optical apparatus has a carrier with a plurality of light sources and, optionally, at least one light-transmissive region.

BACKGROUND

DE 10 2014 112 242 A1 has disclosed techniques for illuminating a specimen from different illumination directions (angle-selective illumination, or structured illumination). It is possible to determine a result image by combining the images obtained for the different, illumination directions, said resulting image having a phase contrast, for example. Thus, digital post-processing may allow phase contrast imaging by means of the angle-selective illumination.

Sometimes, it may be difficult to combine corresponding illumination modules for angle-selective illumination with conventional optical apparatuses, such as, e.g., a laser scanning microscope (LSM) or a light microscope with an objective. This may be the case since only limited installation space is often present in such conventional optical apparatuses.

SUMMARY

Therefore, there is a need for improved implementations of illumination modules for angle-selective illumination, In particular, there is a need for corresponding illumination modules, which can be flexibly integrated into the beam path of an optical apparatus.

This object is achieved by the features of the independent patent claims. The dependent patent claims define embodiments.

According to one example, an LSM incorporates a first illumination module with a laser light source. The LSM also has a second illumination module with a carrier and with a plurality of light sources, which are arranged on the carrier.

For such an LSM, aspects of the angle-selective illumination can be combined with laser scanning imaging.

By way of example, the LSM can be configured for fluorescence imaging. To this end, the LSM may have a specimen holder, for example. The specimen holder can immobilize a specimen object, such as a biological specimen or cell culture, for example, in the beam path. By way of further example, the specimen object can be a phase object which brings about a significant phase change in relation to light passing therethrough. Fluorescence processes in the biological specimen can be excited by the laser light. Then, the detector can be configured to detect a corresponding fluorescence signal of the specimen object.

By way of example, the detector can be embodied as a photomultiplier (PMT). By way of example, the detector can be arranged in transmission geometry or reflection geometry, i.e., downstream (passed beam path) or upstream (reflection beam path) of the specimen holder in relation to the first illumination module. If the detector is arranged in the passed beam path, it is possible to produce a bright-field transmission image, for example.

By way of example, it is possible for the detection spectrum of the detector to differ from an emission spectrum of the laser light source. This may be the case since the fluorescence processes may bring about a conversion of the wavelength between absorbed light and emitted light. However, it would also be possible for the detection spectrum of the detector to at least partly overlap with the emission spectrum of the laser light source.

In principle, it is possible for the LSM to comprise more than one detector for detecting the fluorescence signal. By way of example, a first detector could be arranged in the passed beam path and a second detector could be arranged in the reflection beam path. By way of example, the second detector could be complemented by an Airy unit. By way of example, the second detector could be arranged downstream of a scanning optical unit of the LSM in relation to the specimen holder.

By way of example, the carrier can be arranged in a beam path defined by the laser light source. By way of example, the carrier could have an extent perpendicular to the beam path. Thus, for example, the carrier can extend in a plane that is arranged perpendicular to the beam path. However, the carrier can also extend in a plane that includes an angle of between 0° and 90° with a central ray of the beam path. Thus, the carrier can be arranged at a tilt in relation to the beam path. Here, it may be possible for the carrier also to have a certain extent (thickness) parallel to the beam path.

In exemplary implementations, it is possible for the carrier to have at least one light-transmissive region. By way of example, the at least one light-transmissive region can be embodied within an outer circumference of the carrier. In various examples, the at least one light-transmissive region can be arranged within the carrier, i.e., at a distance from external edges or a circumference of the carriers. An external circumference of the carrier can therefore include the at least one light-transmissive region.

The at least one light-transmissive region can facilitate, e.g., transmission of a significant component of light in a certain spectral range perpendicular to the carrier, i.e., along the thickness thereof. In particular, the light-transmissive region can have a transmittance that is greater than 20%, preferably >80%, particularly preferably >90%, for example. Here, in general, it is not necessary for the light-transmissive region to have a correspondingly large transmittance over a particularly large spectral range. By way of example, it would be possible for the light-transmissive region to only have a significant transmittance in a certain spectral range and only have a comparatively low transmittance in other spectral ranges.

By way of example, the beam path can pass at least partly through the at least one light-transmissive region. Thus, it would be possible for the second illumination module to be arranged in the beam path defined by the laser light source. By way of example, the second illumination module could be arranged concentrically with a central ray of the beam path.

As a result of providing the second illumination module with the light-transmissive region, techniques of angle-selective illumination can be flexibly linked to the construction of the LSM. In particular, it may be possible to arrange the second illumination module within the beam path. This is the case because what the light-transmissive region can achieve is that the beam path is not, or not significantly, modified by the second illumination module.

Here, very different techniques are possible for embodying the light-transmissive region in the carrier. The various examples described herein in relation to embodying the light-transmissive region can also be combined with one another in various scenarios.

One example relates to the implementation of the light-transmissive region as an aperture. Here, the aperture can be embodied as a through hole, for example. Expressed differently, it may be possible to implement the light-transmissive region as a recess in the material of the carrier. By way of example, the aperture can be arranged centrally on the carrier; as an alternative or in addition thereto, it would be possible for the aperture, or a further aperture, to be arranged on the carrier in off-centered fashion. If the aperture is arranged on the carrier in off-centered fashion, it is possible for the aperture—a center of the aperture, for example—to have a certain distance from the center of the carrier. Here, the center of the carrier can be defined as the geometric center of the carrier, for example. As an alternative, it would also be possible for the center of the carrier to be defined by that point of the carrier that is determined by a central ray of the beam path.

The aperture can have lateral dimensions of a plane defined by a surface of the carrier, said dimensions correlating with a beam width of the beam path in the region of the second illumination module. By way of example, the lateral dimensions of the aperture can be more than 50% of the beam width of the beam path, preferably more than 90%, particularly preferably more than 120%.

What can be achieved by implementing the light-transmissive region as an aperture is that the transmittance of the light-transmissive, region of the carrier is particularly high. Moreover, the carrier can be produced easily, for example by drilling or milling.

In various examples, the aperture can remain free when arranging the second illumination module in the LSM; i.e., no further optically effective elements can be arranged within the aperture. However, it would be possible in other examples for optical elements, such as, for example, a lens, a mirror; a beam splitter; a grating, filter, etc., to be arranged at least partly within the aperture. In various examples, it is possible, for example, for the detector to be arranged at least partly in the aperture. Thus, the detector can extend at least partly in the aperture. By way of example, a sensitive area or sensor area of the detector could have a surface that is oriented parallel to the surface of the carrier. By way of example, the aperture could have lateral dimensions parallel to the surface of the carrier that correlate to the lateral dimensions of the sensitive area of the detector.

A particularly space-saving implementation can be achieved by means of such techniques. In particular, it may be possible to place the second illumination module in tight contact with the detector and thus ensure a high degree of integration.

Such an implementation of a combined second illumination module/detector may be desirable, particularly in relation to a PMT in transmission geometry, i.e., for a scenario in which the detector and the second illumination module are arranged downstream of the specimen holder in relation to the first illumination module. In this way, there can be bright-field fluorescence imaging, for example, by means of the detector.

In other examples, it is also possible for the second illumination module not to be arranged in the passed beam path but, instead, to be arranged upstream of the specimen holder in relation to the first illumination module. By way of example, the second illumination module could be arranged between a scanning optical unit of the LSM and an objective of the LSM, e.g., directly in the beam path or mirrored-in. The scanning optical unit and the object can be arranged upstream of the specimen holder in relation to the first illumination module. In this way, an efficient illumination by the second illumination module can be achieved since it is not necessary to pass through the scanning optical unit.

By way of example, it would be possible for the second illumination module to be arranged in a region between the objective and the scanning optical unit, in which the beam width of the beam path is comparatively small—for example, in relation to other regions of the beam path between scanning optical unit and objective. By way of example, it would be possible for the second illumination module to be arranged in the region between the objective and the scanning optical unit, near or at an intermediate image plane.

It would also be possible for the second illumination module to be arranged mirrored into the beam path between the objective and the scanning optical unit. To this end, provision can be made of, for example, a partly reflective mirror as an appropriate input coupling means, said partly reflective mirror including a certain angle with the beam path. As an alternative or in addition thereto, it would also be possible to provide a dichroic filter as an input coupling means, for example if different wavelength regions are exploited.

The detector may have a detection spectrum which, at least in part, is different from an emission spectrum of the light sources of the second illumination module. What can be achieved in this manner, for example in conjunction with the fluorescence imaging, is that an illumination of the specimen object by the plurality of light sources of the second illumination module does not excite fluorescence processes, or only excites these to a small extent. What this can achieve is that the fluorescence imaging is not falsified, or not significantly falsified, by illumination by means of the light sources of the second illumination module. What this may render possible is the operation of phase-contrast imaging, too, in addition to the fluorescence imaging, without the accuracy of the fluorescence imaging being significantly reduced.

In order to carry out the phase-contrast imaging, the above-described detectors of the LSM can be used in various examples. Expressed differently, this can render it possible that, in various examples, the detector or detectors for imaging during illumination by the first illumination module are also used for imaging during illumination by the second illumination module. By way of example, a PMT thus can be used for phase-contrast imaging during illumination by the second illumination module and on the basis of techniques of angle-selective illumination. In such an example, it may be possible to dispense with the provision of a dedicated detector for techniques of angle-selective illumination; this can, in turn, reduce the required installation space.

However, in other examples, it is also possible for the LSM to include a further detector. The further detector can be arranged in such a way that it can be used for techniques of angle-selective imaging. By way of example, the further detector may have a comparatively high resolution, for example in comparison with a PMT. In particular, the further detector can be arranged in such a way that it can he used for imaging in the case of illumination of the specimen object by the second illumination module. If the further detector need not detect any fluorescence signals, a sensitivity of the further detector can be comparatively low, for example in comparison with a PMT. Here it is possible, for example, for the further detector to have a detection spectrum that at least partly overlaps with the emission spectrum of the light sources of the second illumination module. By way of example, it would be possible for the further detector to have a CCD (charge coupled device) sensor. As an alternative or in addition thereto, it would be also possible for the further detector to have a complementary metal oxide semiconductor, used as an image sensor and commonly referred to as a "CMOS" sensor. By way of example, the further detector can be operated as a camera. By the provision of the further detector, it is possible to implement an image capture that is optimized in relation to phase-contrast imaging.

In various examples, the further detector can be positioned at very different positions. In particular, the positioning of the further detector can vary depending on the positioning of the second illumination module. In principle, it would be possible to operate the further detector in transmission geometry or in reflection geometry in relation to the second illumination module and the specimen holder. In one example, it would be possible for the further detector to be arranged between the scanning optical unit and the objective. By way of example, it would be possible for the further detector to be arranged in the region of an intermediate image plane. By way of example, a beam splitter may be provided for the further detector such that a corresponding beam path is mirrored-in.

In further examples, a microscope has an objective and a detection beam path. The detection beam path extends through the objective. The microscope also has an illumination module with a carrier. The carrier has at least one light-transmissive region. The illumination module has a plurality of light sources, which are arranged on the carrier.

For such a microscope with an illumination module, it is possible to obtain effects that are comparable to the effects that can be obtained for the above-discussed LSM. In particular, it may be possible, once again, to integrate the illumination module into the microscope in a particularly space-saving manner. As a result, it may be possible, in turn, to flexibly vary the position of the illumination module.

By way of example, it would be possible for the carrier to be arranged in the detection beam path. In the process, it would be possible for the carrier to have an extent transverse to the detection beam path, for example. In this way, there can be a very particularly space-saving integration of the illumination module into the microscope.

The microscope may also have a camera that defines a further beam path. The further beam path can be at least partly different from the detection beam path. The carrier can have an extent transverse to the further beam path.

By way of example, the microscope can be on optical transmitted-light microscope or reflected-light microscope with a conventional design, i.e., for example, it includes a lens turret with a plurality of objectives, one or more eyepieces in the detection beam path, one or more detectors in the detection beam path and/or a trinocular tube. By way of example, the microscope may also have a further illumination module. Here, the further illumination module may, for example, have a daylight attachment mirror, one or more halogen lamps, one or more mercury high-pressure lamps and/or one or more light-emitting diodes as a light source. The further illumination module may have a condenser that images a radiant field stop onto the specimen object and that assists the resolution of the microscope with its numerical aperture. However, it is also possible for the microscope to have no further illumination module. By way of example, the illumination module with the plurality of light sources can also be used for conventional imaging. In further examples, use can also be made of a purely digital microscope, which, for example, does not have an eyepiece.

By way of example, the detection beam path can be used to provide one or more detectors that image a specimen object arranged on a specimen holder of the microscope with magnification. To this end, the microscope could have one or more eyepieces or detectors, for example.

By way of example, it would be possible for the further beam path to be completely different from the detection beam path. By way of example, it would be possible for the detection beam path to extend on one side of a specimen holder of a microscope while the further beam path extends on the opposite side of the specimen holder. However, the further beam path may also, in part, extend parallel to the detection beam path. By way of example, it would be possible for the further beam path to be mirrored-in to the detection beam path. By way of example, a partly reflective mirror and/or a dichroic filter can be provided to this end.

In one example, it is possible for the further beam path to also extend through the objective. In such an example, the further beam path typically also defines a comparatively large magnification of the specimen object. In another example, it would however also be possible for the further beam path not to extend through the objective. In such an example, the further beam path can define a comparatively low magnification of the specimen object, for example. In this way, the further beam path can facilitate the production of an overview image of the specimen object, for example.

By way of example, it would be possible for the detection beam path to define a first magnification of the specimen object while the further beam path defines a second magnification of the specimen object in relation to the camera. Here, the second magnification can be less than the first magnification. In this way, it may be possible to produce an overview image by means of the camera. By way of example, the overview image can image substantial regions of the specimen holder. By way of example, the second magnification could be dimensioned in such a way that the overview image images more than 50%, preferably more than 80%, particularly preferably more than 100% of the specimen holder. In the case of a sufficiently small magnification, it is possible to image a holding frame of the specimen holder, for example, and the latter can be used for orientation purposes. By means of an image produced by the camera, it may then be possible to undertake rough positioning and/or fine positioning by adjusting the specimen holder.

It is also possible to apply the techniques for forming the light-transmissive region, described above, to the illumination module of the microscope. Here, it would be possible, for example, for the light-transmissive region to be formed by an aperture, e.g., by an aperture arranged in off-centered or centered fashion on the carrier.

By way of example, if the aperture is arranged in off-centered fashion, the aperture can have a distance from a center of the carrier. By way of example, the center of the carrier, as already described above in relation to the LSM, can be defined geometrically and/or in relation to a central ray of the beam path. In such an example of the off-centered arrangement of the aperture, it may be possible for at least one of the light sources of the illumination module to be arranged between the center of the carrier and the light-transmissive region.

In particular, this may render it possible to arrange one or more light sources of the illumination module particularly centrally. This can promote bright-field imaging by the microscope. As a result, it may be possible, for example, for the illumination of the specimen object by the centrally arranged one or more light sources to be collected by a stop of the objective. Expressed differently, this may render it possible for direct light of the centrally arranged one or more light sources to penetrate into the objective.

At the same time, it may be desirable for a distance between the center of the carrier and the light-transmissive region to have comparatively small dimensions—for example, under the boundary condition of the bright-field imaging explained above. In particular, it may be possible for the distance between the light-transmissive region and the center of the carrier to correspond to a projection of a stop aperture of the objective on the carrier. This can ensure a particularly high transmittance of light through the light-transmissive region.

In various examples, it is possible for the aperture to remain free; i.e., no optical elements are arranged in the region of the aperture. However, it would also be possible for the camera to be arranged in the aperture, at least in part. By way of example, a sensor area of the camera can be arranged parallel to a surface of the carrier. By way of example, it would be possible for an imaging optical unit of the camera to be arranged in the aperture, at least in part. By way of example, the imaging optical unit may have at least one element selected from the following group: a lens element; a grating; a filter; a mirror; and a beam splitter. In this way, there can be a particularly space-saving integration of the illumination module into the microscope.

The various light sources can be actuatable in a separated or separate manner. By way of example, this means that the various light sources, if necessary, can be operated by separate control signals. In the examples described herein, different light sources, can be used for implementing the angle-selective illumination. By way of example, the light sources can be selected from the following group: organic light-emitting diodes; solid-state light-emitting diodes; light-emitting diodes; halogen light sources; and laser diodes. Here it is possible, for example, for organic light-emitting diodes and halogen light sources to have a greater lateral dimension parallel to a surface of the carrier than the light-emitting diodes. By providing the at least one light-transmissive region, it is possible to obtain flexibility in relation to the light sources arranged outside of the at least one light-transmissive region.

In one example, the light sources could be arranged in a circular or ring-shaped manner.

By way of example, the light sources can be arranged in a matrix structure, i.e., with one-dimensional or two-dimensional periodicity within a plane defined by a surface of the carrier. The matrix structure can correspond to grating structure of the arrangement. Here, the matrix structure can define a square, rectangular or polygonal unit cell of the corresponding grating structure, for example. By using the matrix structure, it is possible to use a particularly flexible angle-selective illumination. In this way, it is possible to implement particularly meaningful phase-contrast imaging.

By way of example, it would be possible for the light sources to be arranged on a dome-shaped surface of the carrier (illumination dome).

In various examples, the distance between adjacent light sources for the angle-selective illumination can vary. By way of example, it would be possible for the light sources to be arranged on a surface of the carrier with a geometric fill factor that is no greater than 90%, preferably no greater than 50%, particularly preferably no greater than 30%. As a result, it may be possible for particularly little light incident on the carrier to be absorbed or reflected by the light sources.

By way of example, it would be possible for the carrier to be formed from light-transmissive material, for example a solid-state material, at least in the light-transmissive region. By way of example, the carrier could be formed from glass, at least in the light-transmissive region. By way of example, the carrier could be formed from, a transparent plastic film, at least in the light-transmissive region. By way of example, the various light sources could be arranged on different webs of the plastic film. What can be achieved by using the light-transmissive material, particularly in conjunction with a comparatively low geometric fill factor, with which the light sources are arranged on the surface of the carrier, is that the light-transmissive region is formed between two adjacent light sources in each case and dimensioned to be relatively large. What this can achieve is that particularly little light of the beam path incident on the surface of the carrier is reflected or absorbed.

By way of example, it would be possible for the light sources to be arranged more rotationally symmetric in relation to a centrally arranged axis that is perpendicular to a surface of the carrier. By way of example, different light sources could have a different distance from the axis. As a result of this, it may be possible to implement the light-transmissive region in a central region of the carrier. In particular, it may be possible to dimension the light-transmissive region to be comparatively large. Moreover, the techniques of angle-selective illumination may be implemented particularly efficiently by means of such a rotationally symmetric arrangement of the light sources.

In one example, it would be possible for the light sources to be arranged on the carrier outside of the light-transmissive region. In such an example, the light-transmissive region can be embodied by a different element to the light sources, for example, as described above, by an aperture, a light-transmissive solid-state material, etc.

However, in a further example, it would also be possible for the light sources to at least partly form the at least one light-transmissive region. By way of example, the light sources could be implemented as organic light-emitting diodes, which are light-transmissive. As a result of this, it may be possible, on the one hand, to implement a particularly large at least one light-transmissive region; on the other hand, a particularly flexible arrangement of the light sources is possible at the same time.

Such above-described microscopes or laser scanning microscopes can be used for angle-selective illumination. As a result, it may be possible to produce a phase contrast image of an object (result image or "resulting image").

In the case of the angle-selective illumination, the light sources can be actuated separately and/or sequentially for the purpose of producing light. As a result, illuminating an object can be implemented from a plurality of illumination directions. Here, illuminating the object from a certain illumination direction may have the actuation of at least one light source of the illumination module. A separation of the imaging of the object into corresponding measurement images for the different illumination directions can be implemented by the separate and/or sequential actuation of the light sources. In the case of the sequential illumination of the object, the various measurement images can also be captured in sequence; as a result, a separation of the illumination directions over time is brought about. As an alternative or in addition thereto, a separation of the illumination directions can also be obtained by using different spectral regions of the light for different illumination directions. As an alternative or in addition thereto, a separation of the illumination directions can also be obtained by using different polarizations of the light for the different illumination directions. In such cases, corresponding measurement images can also be captured at least partly parallel in time; the separation can be implemented by holding up appropriate color filters and/or polarization filters. Single shot measurements may be possible.

By way of example, a corresponding, laser scanning microscope or a corresponding microscope could have a computing unit. The computing unit may be configured to actuate the plurality of light sources to separately and/or sequentially illuminate an object from a plurality of illumination directions. The computing unit can furthermore be configured to combine a plurality of measurement images associated with the illumination directions to obtain a result image which has a phase contrast.

According to a further example, an illumination module has a carrier. The carrier has a light-transmissive region. The illumination module also has a plurality of light sources, which are arranged on the carrier.

According to a further example, an illumination module has a carrier, a plurality of light sources, which are arranged on the carrier, and at least one detector, which is applied to the carrier. By way of example, an emission spectrum of the plurality of light sources can be at least partly overlapping with a detection spectrum of the at least one detector. By way of example, it would be possible for the at least one detector to be attached centrally or in off-centered fashion on the carrier.

Here, it would be possible for the at least one detector to have a distance from a center of the carrier and for at least one light source of the module to be arranged between the center of the carrier and the at least one detector.

The features set out above and features that are described below may be used not only in the corresponding combinations explicitly set out, but also in further combinations or in isolation, without departing from the scope of protection of the present invention. By way of example, examples relating to the different illumination modules could be combined with examples relating to the LSM and the microscope.

BRIEF DESCRIPTION OF THE DRAWINGS

The properties, features and advantages of this invention described above and the way in which they are achieved will become clearer and more clearly comprehensible in association with the following description of the exemplary embodiments which are explained in greater detail in association with the drawings, in which.

DETAILED DESCRIPTION OF EMBODIMENTS

Figure 1:
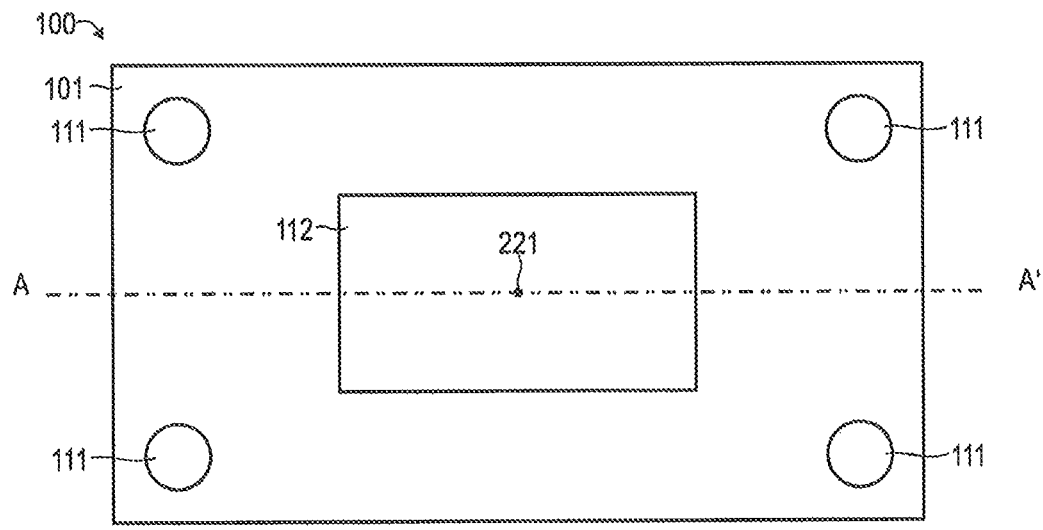
FIG. 1 is a schematic plan view of an illumination module for angle-selective illumination and with a carrier, which has a light-transmissive region according to various embodiments.

The present invention is explained in greater detail below on the basis of preferred embodiments with reference to the drawings. In the figures, identical reference signs designate identical or similar elements. The figures are schematic representations of different embodiments of the invention. Elements illustrated in the figures are not necessarily depicted as true to scale. Rather, the different elements illustrated in the figures are reproduced in such a way that their function and general purpose become comprehensible to the person skilled in the art.

Below, techniques are described in relation to an illumination module, which can be used for the angle-selective illumination of a specimen object. The illumination module has a plurality of light sources, which are arranged at a distance from one another, and thus can implement illumination of a specimen object from a plurality of illumination directions. Then, measurement images, which correspond to the individual illumination directions, can be combined with one another. As a result, a result image can be obtained by digital post-processing, said result image having a phase contrast.

Here, various examples relate to the particularly flexible combination of such an illumination module for angle-selective illumination with optical apparatuses of different configuration. Various examples describe how such an illumination module can be combined with an LSM. Further examples describe how such an illumination module can be combined with a reflected-light microscope or a transmitted-light microscope.

By way of example, different examples describe how such an illumination module can be combined with a laser light source of an LSM. Here, the illumination module could be structurally connected or coupled to a PMT that is arranged in transmission geometry and configured to detect a fluorescence signal of a corresponding specimen object. To this end, the illumination module can have a light-transmissive region, for example, through which light can pass to the detector. By way of example, the illumination module could be implemented by a carrier with a centrally arranged recess/aperture as a light-transmissive region; then it can be possible to at least partly arrange the PMT in the aperture. Here it is also possible, for example, for the emission spectrum of the light sources of the illumination module to differ from the detection spectrum of the PMT. Here, the detection spectrum of the PMT can be matched to the wavelength of a laser light source and/or to the wavelength of a fluorescence signal; by way of example, the emission spectrum of the light sources of the illumination module can lie in the infrared spectral range.

In further examples, it would be possible, for example, for the illumination module to have a perforated carrier, wherein no further optical elements are arranged in the aperture or apertures. In other examples, different optical elements can be arranged in the region of the at least one aperture, for example, a lens, a Bertrand lens with angle-selective shadowing, a grating, etc.

In various examples, it may be possible to combine the illumination module with an optical microscope. Here, the illumination module can be arranged in a detection beam path or in a further beam path of the illumination module, for example, wherein the further beam path can at least partly differ from the detection beam path. In various examples, it is possible to combine such an illumination module with an overview camera. By way of example, the overview camera can be configured to capture an overview image of a specimen holder of the microscope. A corresponding beam path that is associated with the camera can therefore have a comparatively low magnification.

By way of example, the microscope can be a conventional reflected-light microscope or transmitted-light microscope. Such techniques can be applied, in particular, in conjunction with wide-field microscopy, in which an overview image of a specimen object is created and fine positioning takes place on the basis of the overview image.

The individual configuration and arrangement of the light sources of such an illumination module for angle-selective illumination can vary in different examples. By way of example, an LED array could be used as a corresponding matrix structure. In other examples, use could also be made of light sources with a comparatively large lateral extent, such as halogen light sources or organic light-emitting diodes, for example. By way of example, these could be arranged in different quadrants on the carrier in relation to a centrally arranged aperture, which forms the light-transmissive region. Optionally, it is also possible for organic light-emitting diodes themselves to have a light-transmissive configuration and thus implement the light-transmissive region.

The illumination module having a light-transmissive region can be dispensed with in various examples. By way of example, the illumination module could have a continuous carrier, which is not light-transmissive, in such examples. By way of example, it would be possible here for the at least one detector to be applied, for example adhesively bonded, to the carrier. By way of example, the detector could be applied centrally or in off-centered fashion on the carrier.

Different effects can be obtained by means of such techniques. By way of example, it may be possible to combine different imaging techniques with one another. By way of example, conventional, analog imaging techniques—such as analog, optical reflected-light microscopy or analog, optical transmitted-like microscopy or fluorescence imaging, for example—can be combined with techniques that are based on digital post-processing. Moreover, it is possible to combine fluorescence imaging techniques with techniques from non-fluorescence imaging. By way of example, digital techniques in conjunction with angle-selective illumination, as described in conjunction with DE 10 2014 112 242 A1, may facilitate a fully automatic or at least partly automatic production of a fitting contrast. The corresponding disclosure, in the entirety thereof, is incorporated herein by cross-reference. Therefore, such techniques can also be implemented without in-depth expert knowledge. Particularly in conjunction with the fluorescence imaging, using suitable emission spectra of the light sources of the illumination module renders it possible to avoid biological specimen objects being used up by the techniques of angle-selective illumination and thus adversely affecting the fluorescence imaging. Moreover, it is possible to implement optical apparatuses which, as described above, combine different imaging techniques but use a common objective to this end. This saves installation space and reduces costs and complexity. By way of example, by means of the techniques of angle-selective illumination, it may be possible to produce phase-contrast images; here, the provision of a specific differential phase-contrast (DIC) optics or Zernike optics may be dispensed with.

FIG. 1 illustrates an exemplary illumination module 100. FIG. 1 is a plan view of the illumination module 100, The illumination module 100 has a carrier 101. By way of example, the carrier 101 can be configured as a solid plate. The carrier 101 can be formed from transparent material, i.e., light-transmissive material, such as glass or plastic, for example, or else it can be formed from non-light-transmissive material. By way of example, the carrier 101 could be produced from metal, for example steel or aluminum. The carrier can be embodied as a plate.

In the example of FIG. 1, a total of four light sources III are arranged on the carrier 101 in a manner offset in relation to a geometric center, which corresponds to an axis 221. The light sources 111 are arranged in different directions in relation to the axis 221. In particular, the light sources 111 are arranged in different quadrants in relation to the axis 221. By way of example, the light sources 111 can be implemented by way of light-emitting diodes. Other types of light sources 111 can also be used. It is evident from FIG. 1 that the light sources 111 are arranged at different positions in relation to the geometric center of the carrier 101. As a result, the angle-selective illumination can be implemented, for example in a scenario in which the central axis 221 extends along a central ray of a beam path of an optical apparatus, which receives the illumination module 100. In particular, the light sources 111 are arranged more rotationally symmetric in relation to the central axis 221. This may be expedient if the angle-selective illumination should be implemented for very different directions, for example in order to produce a particularly strong phase contrast.

A light-transmissive region 112 is arranged in the region of the geometric center of the carrier 101. In principle. the light-transmissive region 112 is optional. In one example, the light-transmissive region 112 can be implemented by light-transmissive solid material; examples of light-transmissive material would be, for example: glass; plastic; plastics film; etc. By way of example, the light-transmissive material can be embedded in the surrounding material of the carrier 101 and can be securely connected to the latter. By way of example, the light-transmissive region 112 could be implemented as a glass plate, which is embedded in the metallic carrier. In a further example, the light-transmissive region 112 can be implemented by a cutout or an aperture.

While a single, contiguous light-transmissive region 112 is illustrated in relation to the example of FIG. 1, the provision of more than one light-transmissive region may be possible in other examples. By way of example, a plurality of apertures that are separated from one another could be provided. Here, appropriate techniques, as explained above in relation to FIG. 1, can be applied.

What can he achieved as a result of the light-transmissive region is that the illumination module 100 can be combined particularly flexibly with an optical apparatus. By way of example, it may be possible for the illumination module 100 to be arranged within the beam path of the optical apparatus; then, light can pass through the light-transmissive region 112 along the beam path through the illumination module 100. In this way, the illumination module 100 can be flexibly integrated into the optical apparatus.

Figure 2:
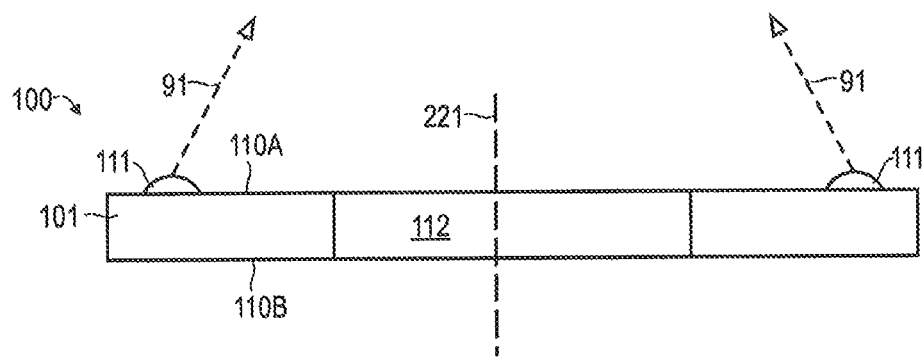
FIG. 2 is a schematic side view of the illumination module for angle-selective illumination according to FIG. 1.

FIG. 2 is a lateral sectional view of the illumination module 100 from FIG. 1 along the dash-dot-dotted line A-A' in FIG. 1. In FIG. 2, the surfaces 110A, 110B of the carrier 101 are illustrated. FIG. 2 illustrates, in particular, an upper side 110A and a lower side 110B of the carrier 110. The upper side 110A and the lower side 110B have a plane embodiment; in other examples, these could also have a non-planar form.

It is evident from FIG. 2 that, for example, light incident from above or below can pass along the central axis 221 through the illumination module 100 in the region of the light-transmissive region 112 without significant reflection or absorption. Therefore, it is possible to combine illumination module 100 flexibly with different optical apparatuses such as, for example, an LSM or a conventional reflected-light microscope or transmitted-light microscope. In particular, it may be possible to arrange illumination module 100 in the beam path of an optical apparatus.

FIG. 2 also illustrates the illumination directions 91 respectively associated with the light sources 111.

Figure 3:
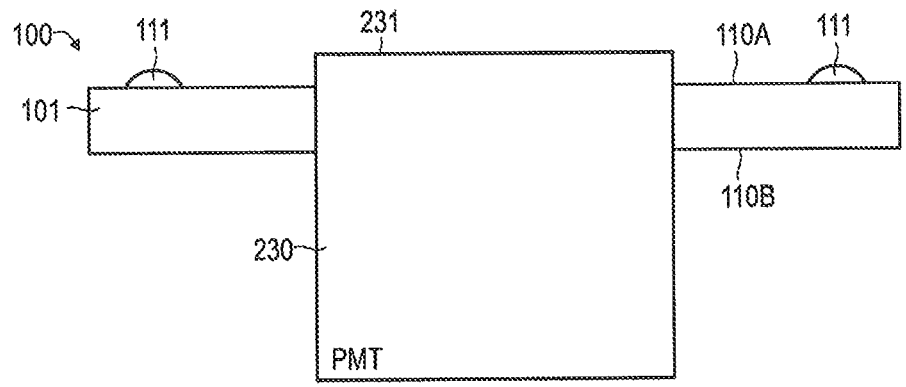
FIG. 3 is a schematic side view of the illumination module for angle-selective illumination according to FIG. 1, wherein, in the example of FIG. 3, a detector is partly arranged in the aperture.

FIG. 3 illustrates aspects in respect of the arrangement of a detector 230 in the light-transmissive region, which is embodied as an aperture that is arranged centrally on the carrier 110. In one example, in which the light-transmissive region 112 is embodied as an aperture, it is possible to at least partly arrange other optically effective elements, such as, e.g., a detector 230, in the aperture. Such a scenario is shown in FIG. 3. In the example in FIG. 3, a PMT, which may be configured, for example, to detect a fluorescence signal in a biological specimen object, is arranged in the region of the aperture, which implements the light-transmissive region 112. In particular, a sensitive area 231 of the detector 230 is spaced apart from the upper side 110A; this means that the detector 230 projects beyond the upper side 110A along the axis 221. What this can achieve is that light incident from above can be detected by the detector 230 without great losses on account of the illumination module 100.

Figure 4:
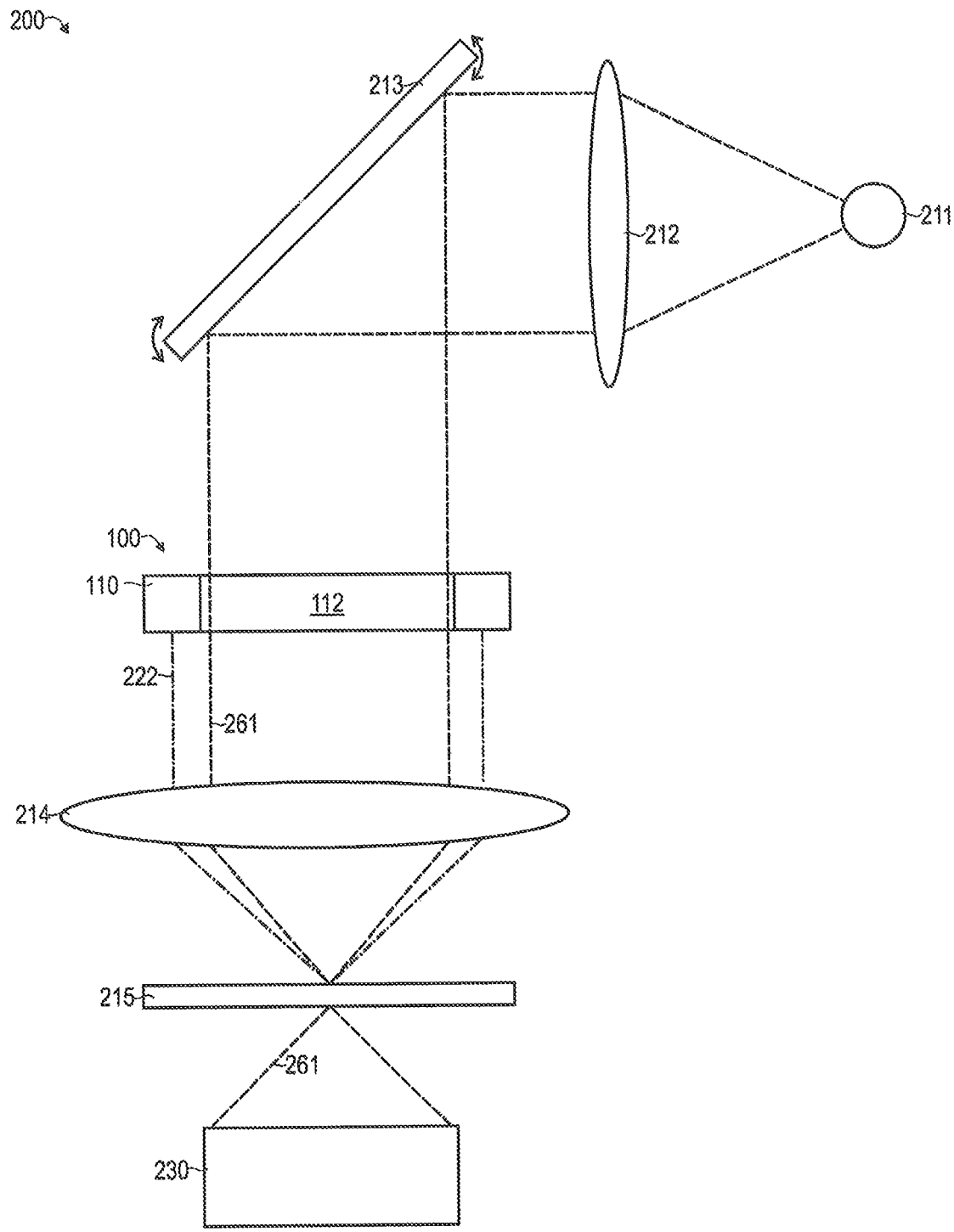
FIG. 4 schematically illustrates an LSM according to various embodiments, wherein, in the example of FIG. 4, the illumination module for angle-selective illumination and with the carrier is arranged in the region between a scanning optical unit of the LSM and an objective of the LSM in the beam path of a laser light source of the LSM.

FIG. 4 illustrates aspects in relation to an LSM 200. The LSM 200 has a first illumination module 211, which has a laser light source. The laser light source defines a first beam path 261 (illustrated by a dashed line in FIG. 4), A collimator optical unit 212 is provided. A scanning optical unit 213 is arranged in the beam path 261. An objective 214 is arranged close to a specimen holder 215. In relation to the first illumination module 211, the scanning optical unit 213 and the objective 214 are arranged upstream of the specimen holder 215 and directly in the beam path 261. The specimen holder 215 is configured to immobilize a specimen object in the beam path 261. The LSM 200 also has a detector 230, e.g., a PMT. The detector 230 is suitable for detecting a fluorescence signal of the specimen object.

In the example in FIG. 4, the detector 230 is arranged downstream of the specimen holder 215 in relation to the illumination module 211, i.e., in the passed beam path 221. In other examples, the detector 230 could also be arranged upstream of the specimen holder 215 in relation to the illumination module 211. To this end, output coupling in relation to the beam path 261 could be provided, for example in the form of a partly reflective mirror as a beam splitter (not illustrated in FIG. 4).

FIG. 4 also illustrate aspects in relation to the illumination module 100 for angle-selective illumination. By way of example, use could be made of the illumination module 100, which was discussed above in relation to FIGS. 1-3. FIG. 4 illustrates an exemplary arrangement of the illumination module 100 in the beam path 261. In the example in FIG. 4, the illumination module 100 is arranged between the scanning optical unit 213 and the objective 214, directly in the beam path 261. Here, it is clear that the light-transmissive region 112 has a lateral dimension that is greater than a beam width of the beam path 261 perpendicular to the beam path 261. Therefore, it is possible for the light to at least partly or largely pass through the illumination module 100 or the light-transmissive region along the beam path 261.

The illumination module 100 defines a further beam path 222 (dot-dashed line in FIG. 4). The beam path 222, too, can be used to illuminate the specimen object (not illustrated in FIG. 4) on the specimen holder 215. For the purposes of detecting a signal during the illumination of the specimen object by the illumination module 100, use can be made, for example, of the detector 230 or a further detector (not illustrated in FIG. 4).

Figure 5:
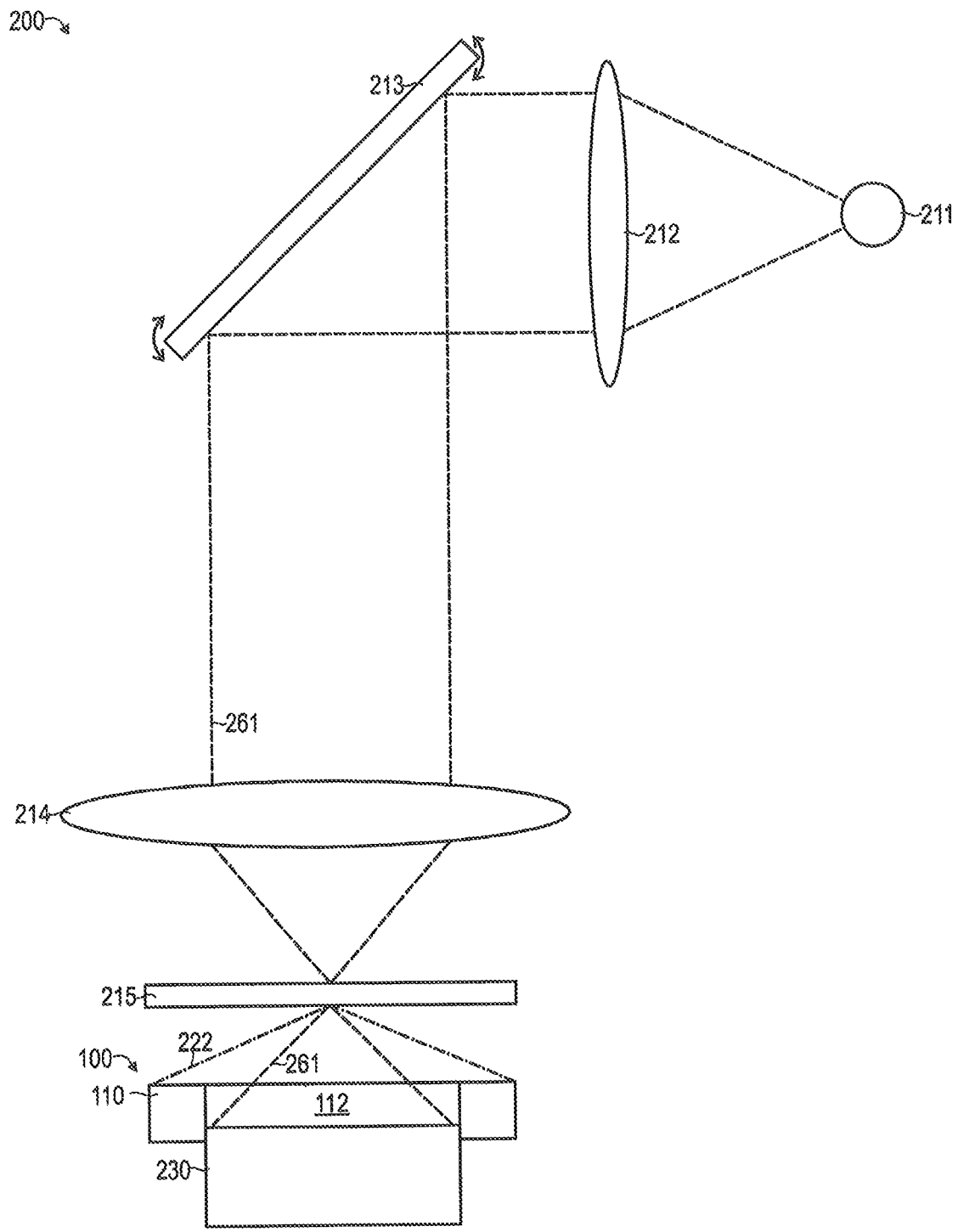
FIG. 5 schematically illustrates an LSM according to various embodiments, wherein, in the example of FIG. 5, the illumination module for angle-selective illumination and with the carrier is arranged downstream of a specimen holder of the LSM in relation to the laser light source of the LSM, in a passed beam path, wherein, in the example of FIG. 5, furthermore, the detector is partly formed in the aperture that is arranged centrally on the carrier.

FIG. 5 illustrates aspects in relation to an LSM 200. The LSM 200 according to the example of FIG. 5 substantially corresponds to the ISM 200 according to the example of FIG. 4. However, in the example in FIG. 5, the illumination module 100 is arranged at a different location in relation to the beam path 261. In the example in FIG. 5, the illumination module 100 is arranged in the passed beam path 261, i.e., on the opposite side of the specimen holder 215 in relation to the illumination module 211. In the example in FIG. 5, the detector 230 is partly arranged in the aperture implementing the light-transmissive region 112.

Despite the spatial proximity between the illumination module 100 and the detector 230, an interaction between these elements 100, 230 can be comparatively low. By way of example, this can be achieved by virtue of the detection spectrum of the detector 230 being different from the emission spectrum of the light sources 111.

While the detector 230 is arranged in the aperture of the light-transmissive region 112 in FIG. 5, the detector 230 and the illumination module 100 could be arranged separately from one another in the passed beam path in other examples, for example, according to an arrangement as discussed in FIG. 4.

The examples above illustrated scenarios in which the carrier 110 of the illumination module 100 has a light-transmissive region 112, which is implemented by an aperture, for example. However, in other examples, it is possible for the carrier 110 not to have a corresponding light-transmissive region 112. Such a scenario is illustrated in the example in FIG. 6A.

Figure 6A:
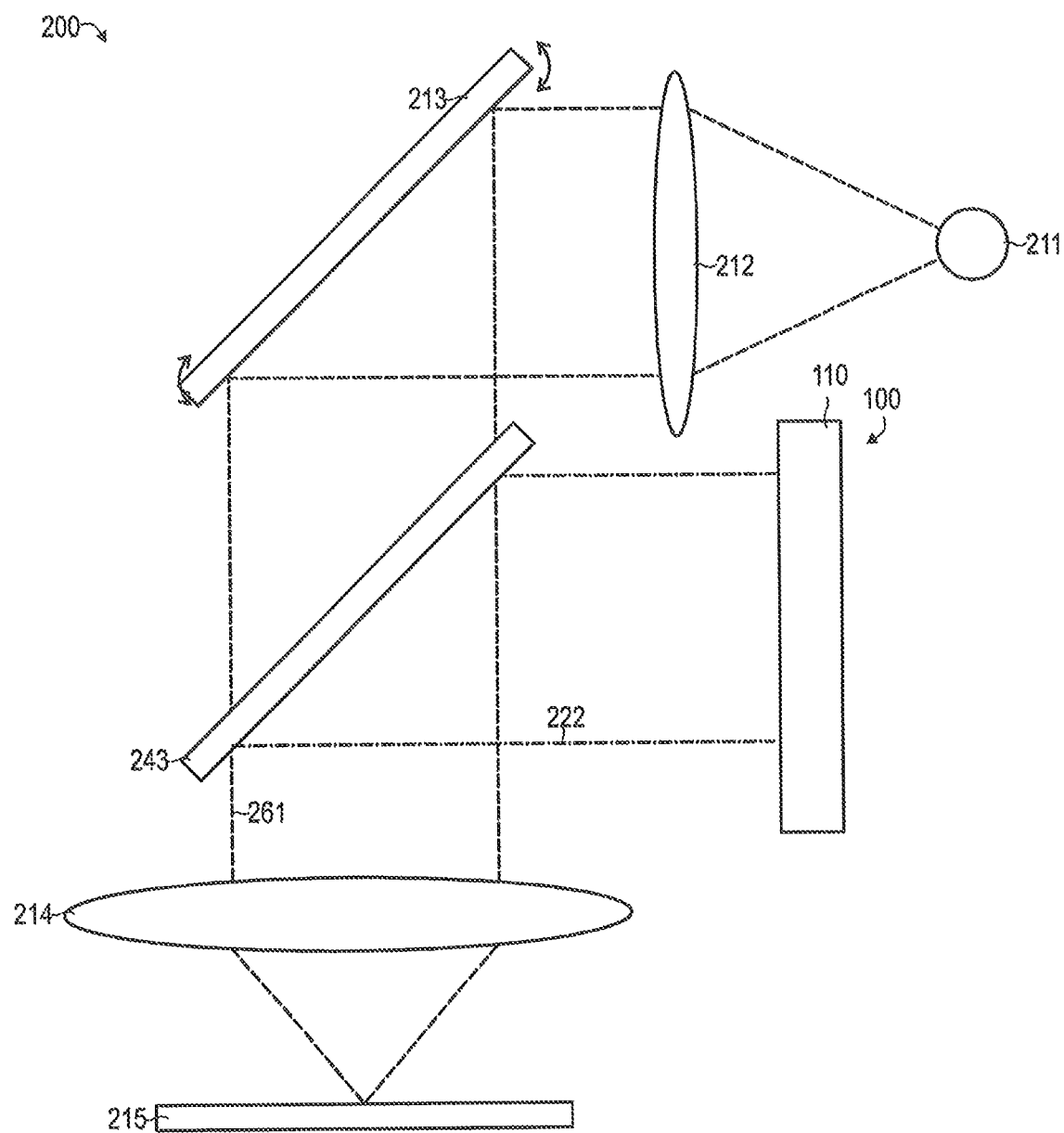
FIG. 6A schematically illustrates an LSM according to various embodiments, wherein, in the example of FIG. 6A, the illumination module for angle-selective illumination and with the carrier is arranged in the region between a scanning optical unit of the LSM and an objective of the LSM, mirrored into the beam path of the laser light source.

FIG. 6A illustrates aspects in relation to an LSM 200. In principle, the LSM 200 corresponds to the LSMs 200 discussed in relation to FIGS. 4 and 5 above. In the scenario in FIG. 6A, the illumination module 100 is arranged between the scanning optical unit 213 and the objective 214 in mirrored-in fashion. To this end, provision is made of a partly reflective mirror 243, which merges the beam path 222 associated with the illumination module 100 with the beam path 261. A light-transmissive region 112 is not provided.

Figure 6B:
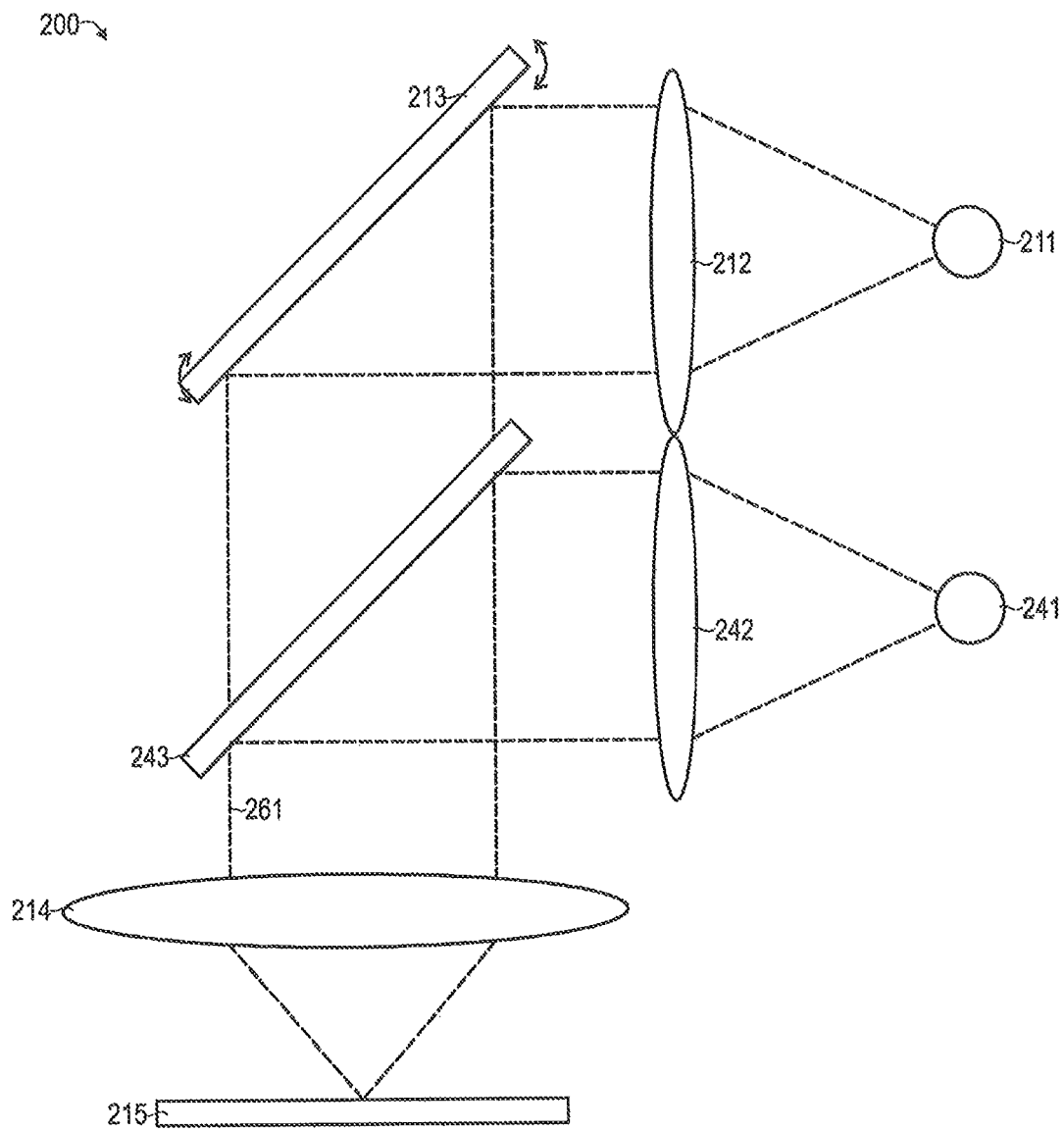
FIG. 6B schematically illustrates an LSM according to various embodiments, wherein, in the example of FIG. 6B, a further detector is arranged in mirrored-in fashion between the scanning optical unit and the objective of the LSM, wherein the further detector is configured for imaging a specimen object during illumination by the illumination module for angle-selective illumination.

FIG. 6B illustrates aspects in relation to an LSM 200. In particular, FIG. 6B illustrates aspects in relation to a further detector 241 (for reasons of clarity, the detector 230 is not illustrated in FIG. 6B; the latter could be arranged in the passed beam path or in the reflection beam path). The further detector 241 can be used to capture signals when the specimen object is illuminated by the further illumination module 100 (not illustrated in FIG. 6B for reasons of simplicity). In the example in FIG. 6B, the detector 241 is arranged between the scanning optical unit 213 and the objective 214 in mirrored-in fashion. To this end, provision is made of a further optical unit 242 and an output coupling unit 243. The arrangement, of the detector 241 in FIG. 6B is purely exemplary; by way of example, in other implementations, the detector 241 could be arranged downstream of the scanning optical unit 213 in relation to the specimen holder 215 or else it could be arranged in the passed beam path 261, i.e., downstream of the specimen holder 215 in relation to the illumination module 211.

By way of example, the detector 241 may be a CCD sensor or a CMOS sensor. By way of example, the detector 241 could be part of a camera. By way of example, the detector 241 could produce an overview image. However, the detector 241 could also produce a greatly magnified image.

Figure 7:
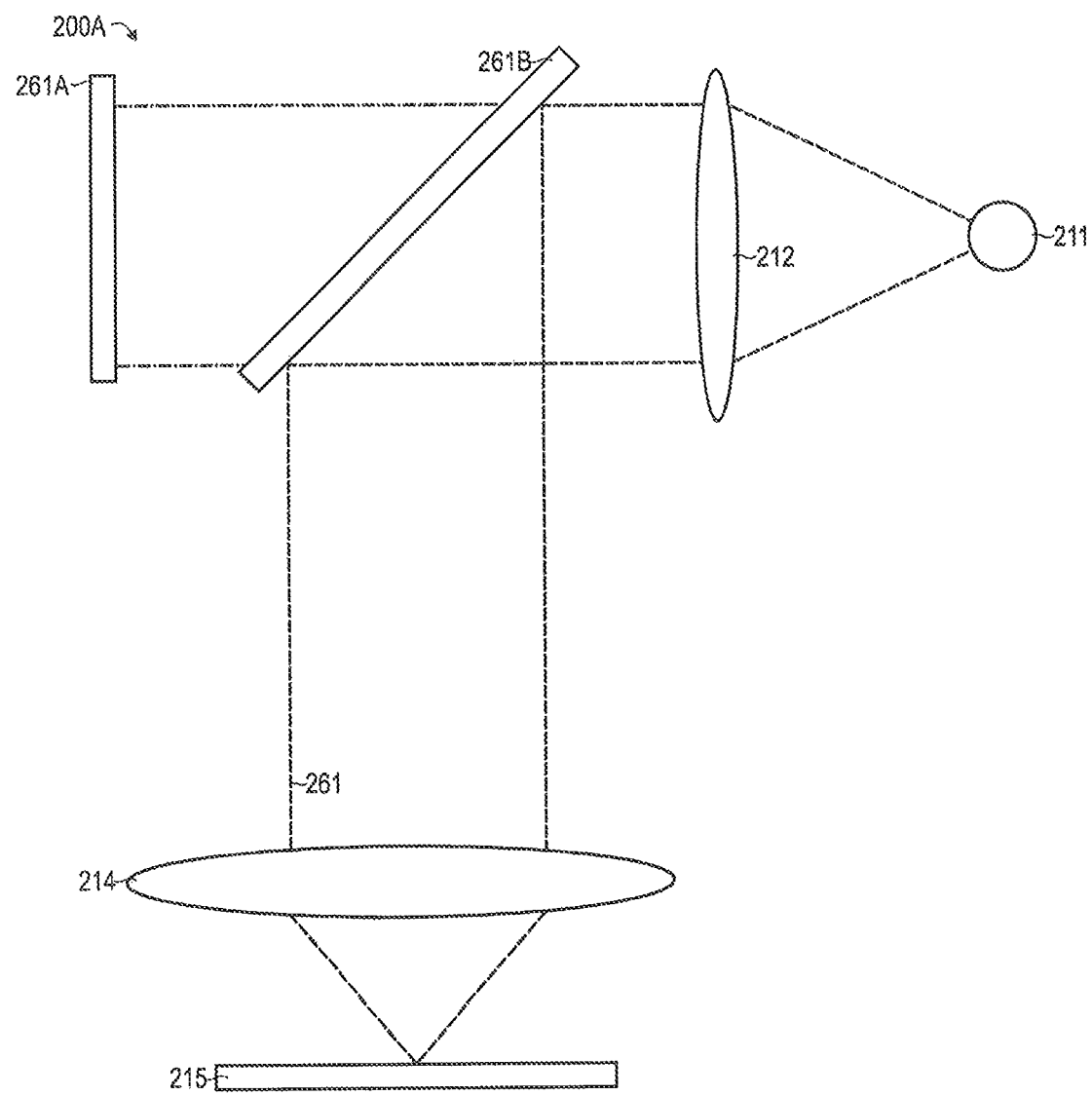
FIG. 7 schematically illustrates a conventional LSM, which has an illumination module with a halogen light source for phase-contrast imaging.

FIG. 7 illustrates aspects in relation to a conventional LSM 200A according to reference implementations, which also has a further illumination module 261A in addition to the illumination module 211 with the laser light source, it being possible to use said further illumination module in combination with a suitable objective (not illustrated in FIG. 7) for phase-contrast imaging purposes. In such a conventional LSM 200A, it may be necessary to replace the objective 214 with a further objective (not illustrated in FIG. 7), depending on the illumination mode (illumination by the illumination module 211 or the illumination module 261A). This increases the required installation space and requires a complicated mechanism. Moreover, it may not be possible, or only possible to a restricted extent, to simultaneously implement an illumination by the illumination module 211 and the illumination module 261A. By way of example, the mirror 261B may be tilted depending on the selected illumination.

Figure 8A:
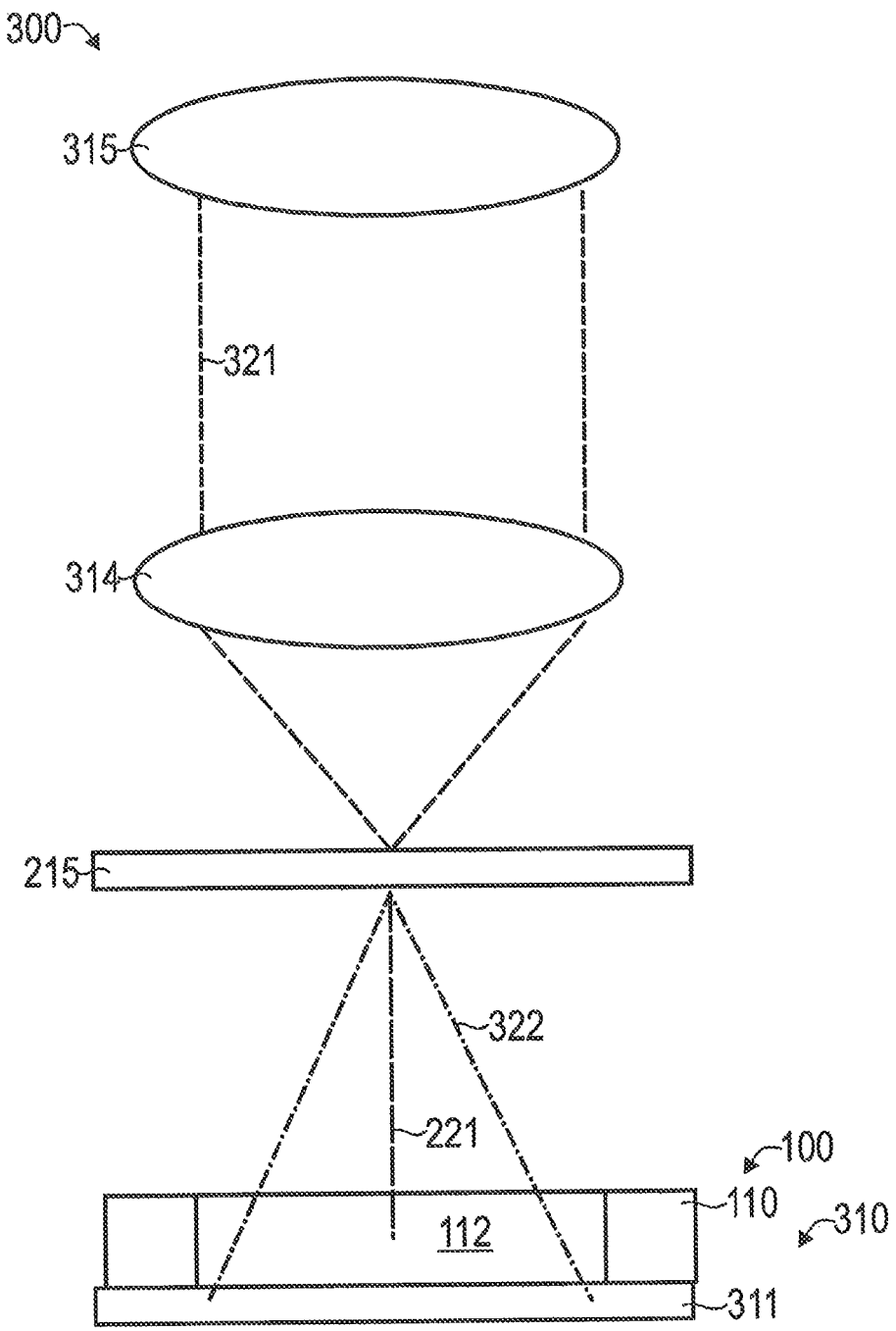
FIG. 8A schematically illustrates a microscope with a camera according to various embodiments, wherein the illumination module for angle-selective illumination is arranged in a passed beam path assigned to the camera.

FIG. 8A illustrates aspects in relation to an optical microscope 300, for example a reflected-light microscope or a transmitted-light microscope. The microscope 300 has an eyepiece 315 and an objective 314. The eyepiece 315 defines a detection beam path 321 (illustrated by the dashed line in FIG. 8A). While the example in FIG. 8A illustrates an eyepiece 315, the detection beam path 321 could also be combined with other units in other examples, for example with a CCD camera, etc. A corresponding statement applies to all examples described herein. The microscope 300 also has a specimen holder 215, which is configured to immobilize a specimen object in the beam path 321.

In the example in FIG. 8A, a camera 310, which is used to provide an overview image of the specimen holder 215 or the specimen object, is arranged in the passed beam path 322—which does not extend through the objective 314. The illumination module 100 is also arranged in the passed beam path 322. The central axis 221 is arranged concentrically with a central ray 221 of the passed beam path 322. The central ray corresponds to the optical axis of the microscope 300. The carrier 110 of the illumination module 100 is rigidly coupled to a camera body 311. Here, the illumination module 100 can be configured according to the other examples described herein. In particular, the illumination module 100 has a plurality of light sources 111 (not shown in FIG. 8A). The illumination module 110 is arranged in such a way that light along the beam path 322 can pass through the light-transmissive region 112, for instance an aperture that is arranged centrally or in off-centered fashion. The camera 310 is partly arranged in the aperture. As a result of providing the illumination module 110 in the beam path 322, it is possible to carry out a particularly space-saving implementation of the angle-selective illumination.

Figure 8B:
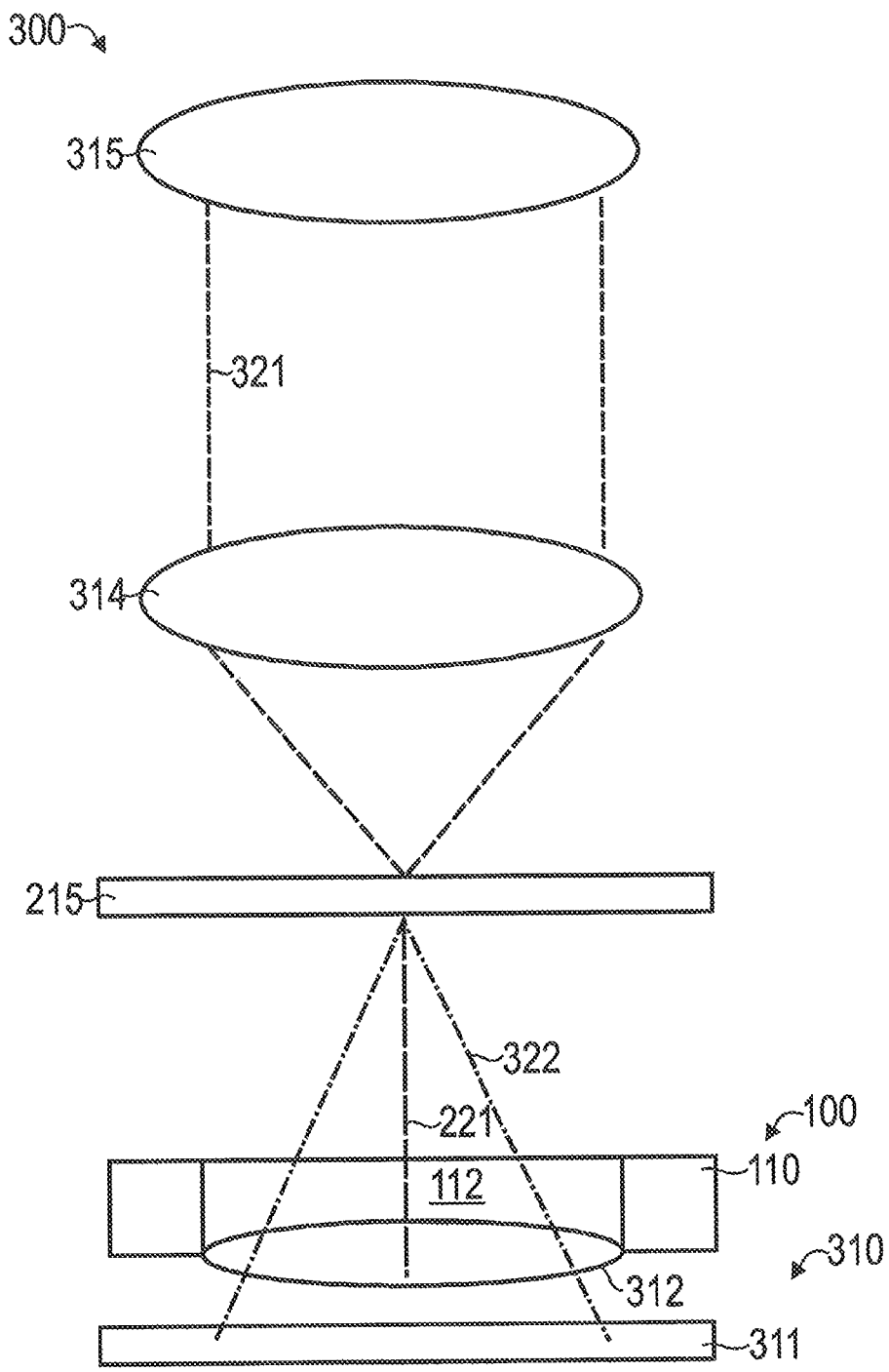
FIG. 8B schematically illustrates a microscope with a camera according to various embodiments, wherein the illumination module for angle-selective illumination is arranged in a passed beam path assigned to the camera.
Figure 8C:
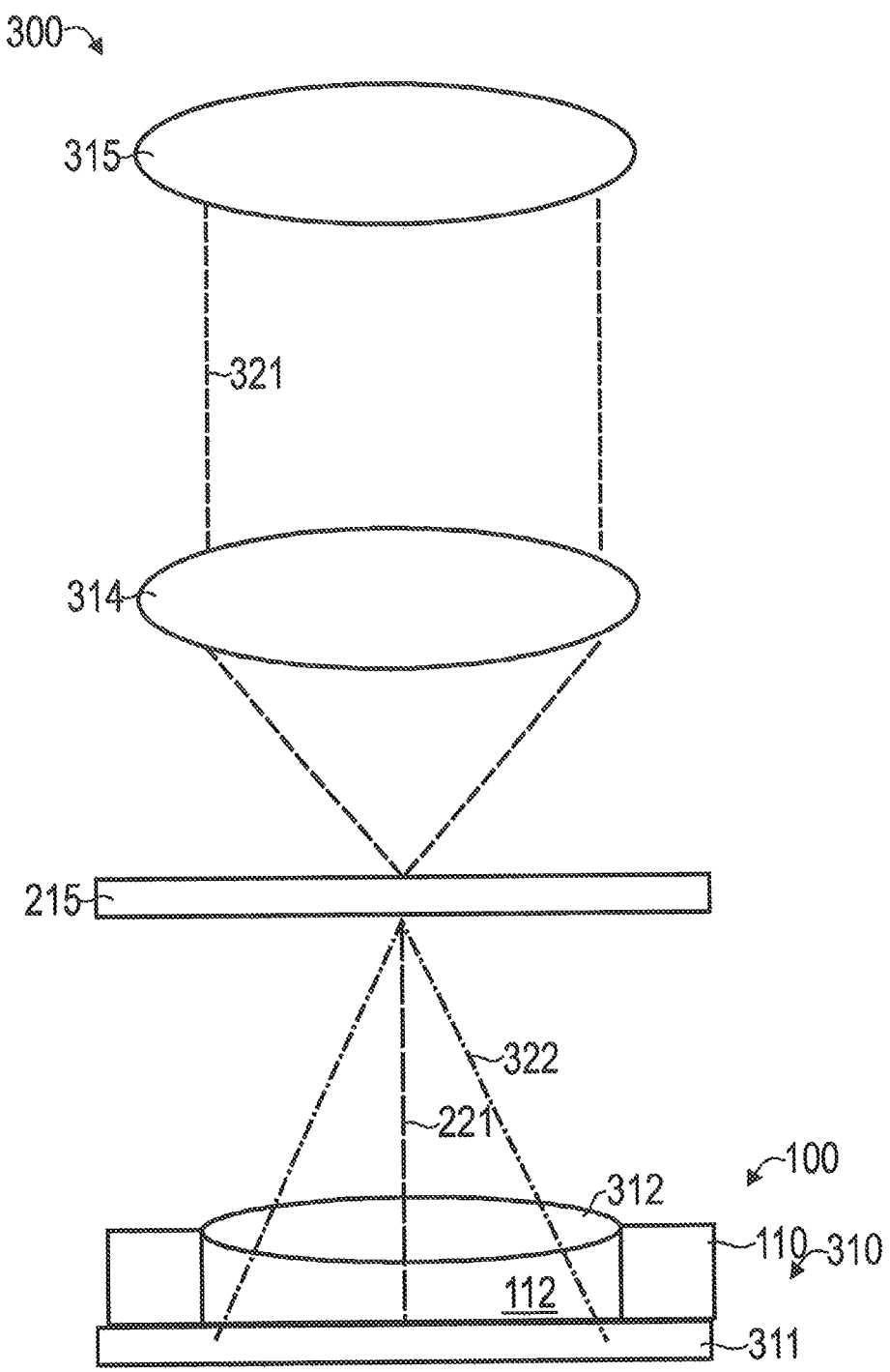
FIG. 8C schematically illustrates a microscope with a camera according to various embodiments, wherein the illumination module for angle-selective illumination is arranged in a passed beam path assigned to the camera.

FIGS. 8B and 8C illustrate aspects in relation to an optical microscope 300, for example a reflected-light microscope or a transmitted-light microscope. In principle, the optical microscope 300 according to FIGS. 8B, 8C corresponds to the optical microscope 300 according to FIG. 8A. In particular, the camera 310 and the illumination module 100 for angle-selective illumination are arranged, once again, in the passed beam path 322. However, in this case, the carrier 110 is not securely coupled to the camera body 311 in the example of FIG. 8B. In the example in FIG. 8B, an imaging optical unit 312 that is associated with the camera 310 is partly arranged in the light-transmissive region 112. In the example in FIG, 8C, the imaging optical unit 312 is, once again, partly arranged in the light-transmissive region 112, with, however, the carrier 110 being rigidly coupled to the camera body 311.

Figure 9A:
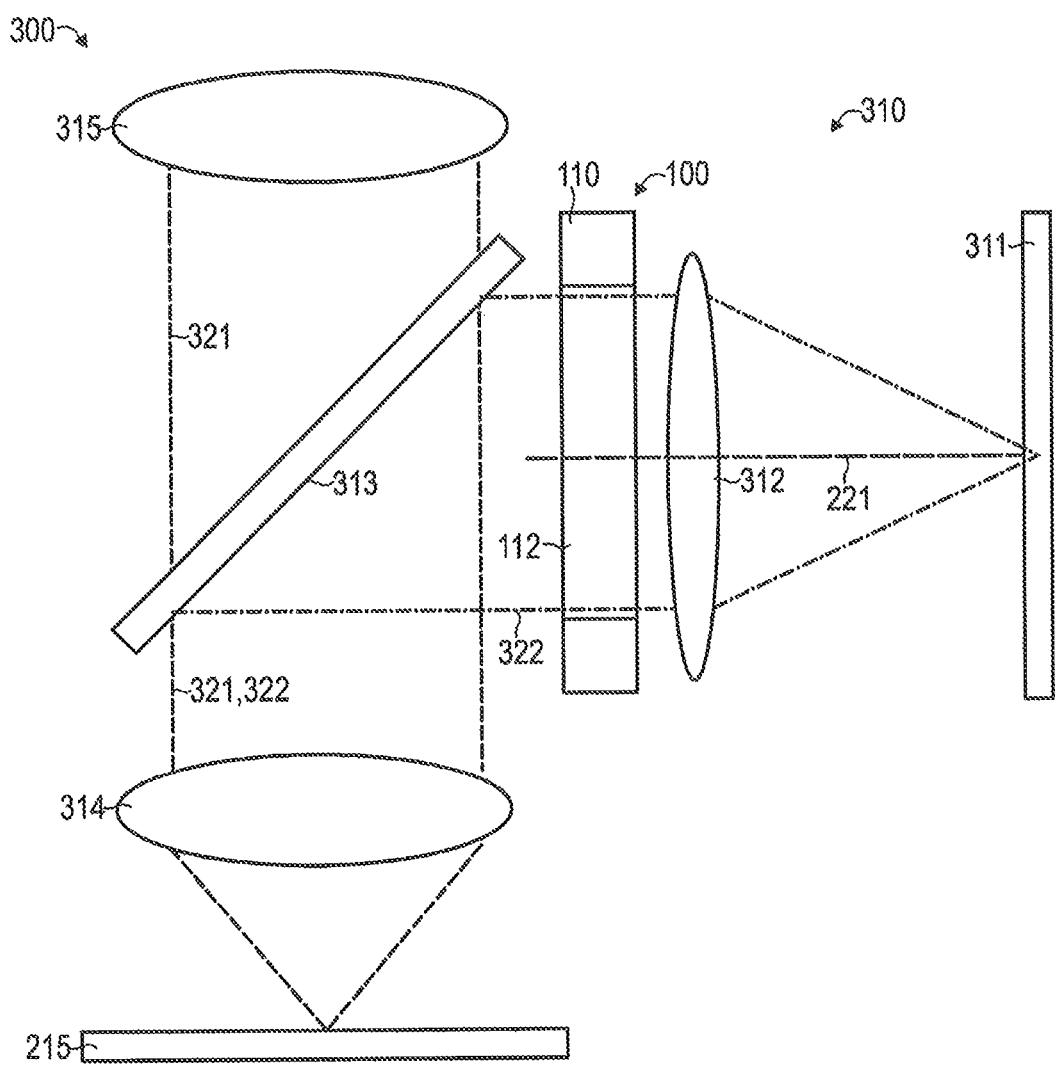
FIG. 9A schematically illustrates a microscope according to various embodiments, wherein the illumination module for angle-selective illumination is arranged in a beam path assigned to the camera.

FIG. 9A illustrates aspects in relation to an optical microscope 300, for example a reflected-light microscope or a transmitted-light microscope. In principle. the microscope in FIG. 9A corresponds to the microscope 300 in FIGS. 8A-8C. However, the beam path 322 associated with the camera 310 (illustrated by the dash-dotted line in FIG. 9A) in this case also extends through the objective 314. In particular, the beam path 322 is mirrored into the detection beam path 321. To this end, the microscope 300 has an output coupling unit 313, for example a beam splitter such as a partly reflective mirror. The imaging optical unit 312 is arranged in the region of the beam path 322. Moreover, the illumination module 110 is arranged in the region of the beam path 322. In particular, the illumination module 110 is arranged in such a way that light can pass through the light-transmissive region 112 along the beam path 322. The central axis 221 is arranged concentrically with a central ray of the beam path 322. As a result of providing the illumination module 110 in the beam path 322, it is possible to carry out a particularly space-saving implementation of the angle-selective illumination.

By way of example, it would be possible for the camera 311 to capture an image for the specimen object illuminated by the angle-selective illumination by means of the illumination module 110. It would also be possible to provide a further detector (not illustrated in FIG. 9A); the latter could be arranged in the passed beam path 322 or in the reflection beam path 322.

Figure 9B:
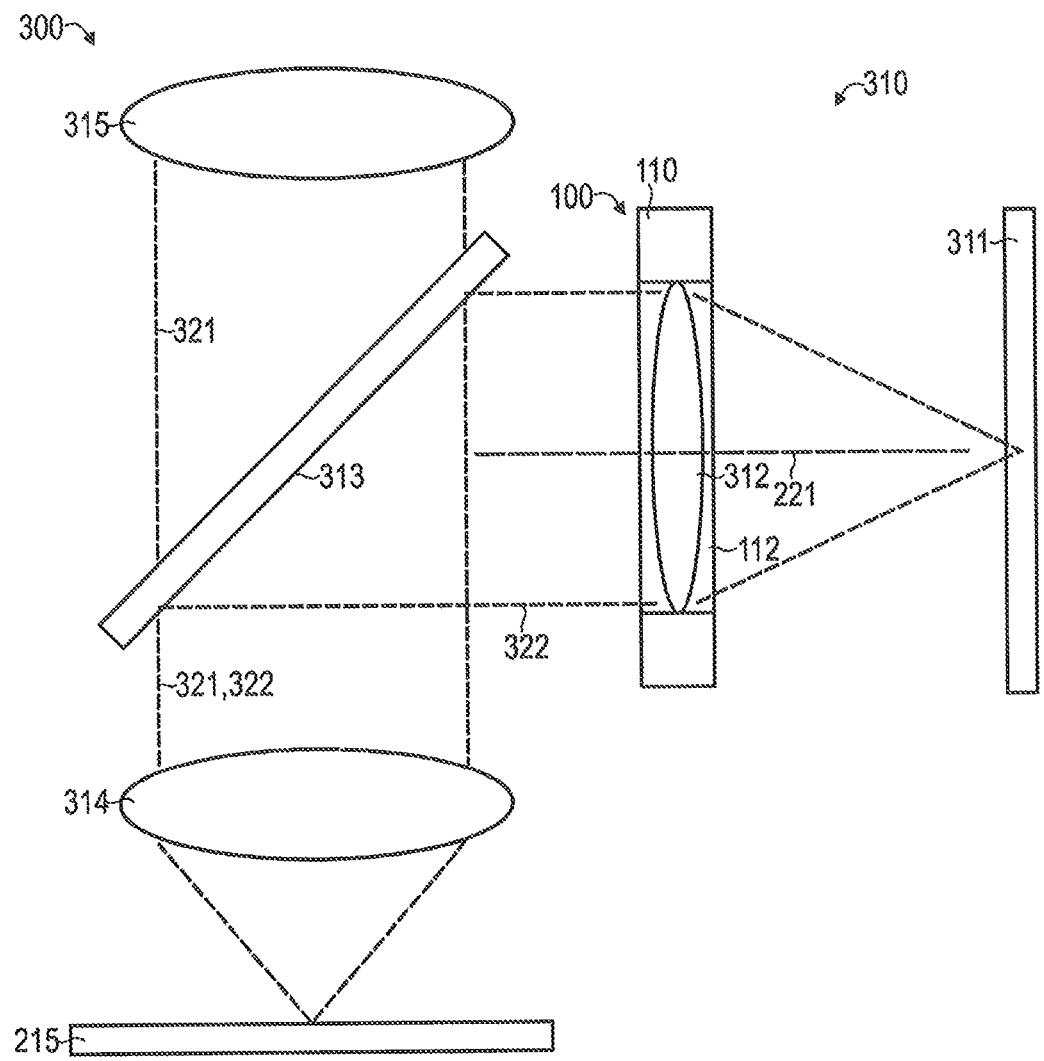
FIG. 9B schematically illustrates a microscope according to various embodiments, wherein the illumination module for angle-selective illumination is arranged in a beam path assigned to the camera and an imaging optical unit is arranged in the region of an aperture that is arranged centrally on the carrier.

FIG. 9B illustrates aspects in relation to a microscope 300. In principle, the microscope 300 of the example in FIG. 9B corresponds to the microscope 300 of the example in FIG. 9A. In the example in FIG. 9B, the imaging optical unit 312 is partly arranged in the light-transmissive region 112 of the illumination module 100. Here, the light-transmissive region 112 can be embodied as an aperture, as already described above. By way of example, it would be possible for a lens element, a grating and/or a filter of the imaging optical unit 312 to be arranged in the aperture. In this way, a particularly space-saving integration of the illumination module 100 can be ensured.

Figure 9C:
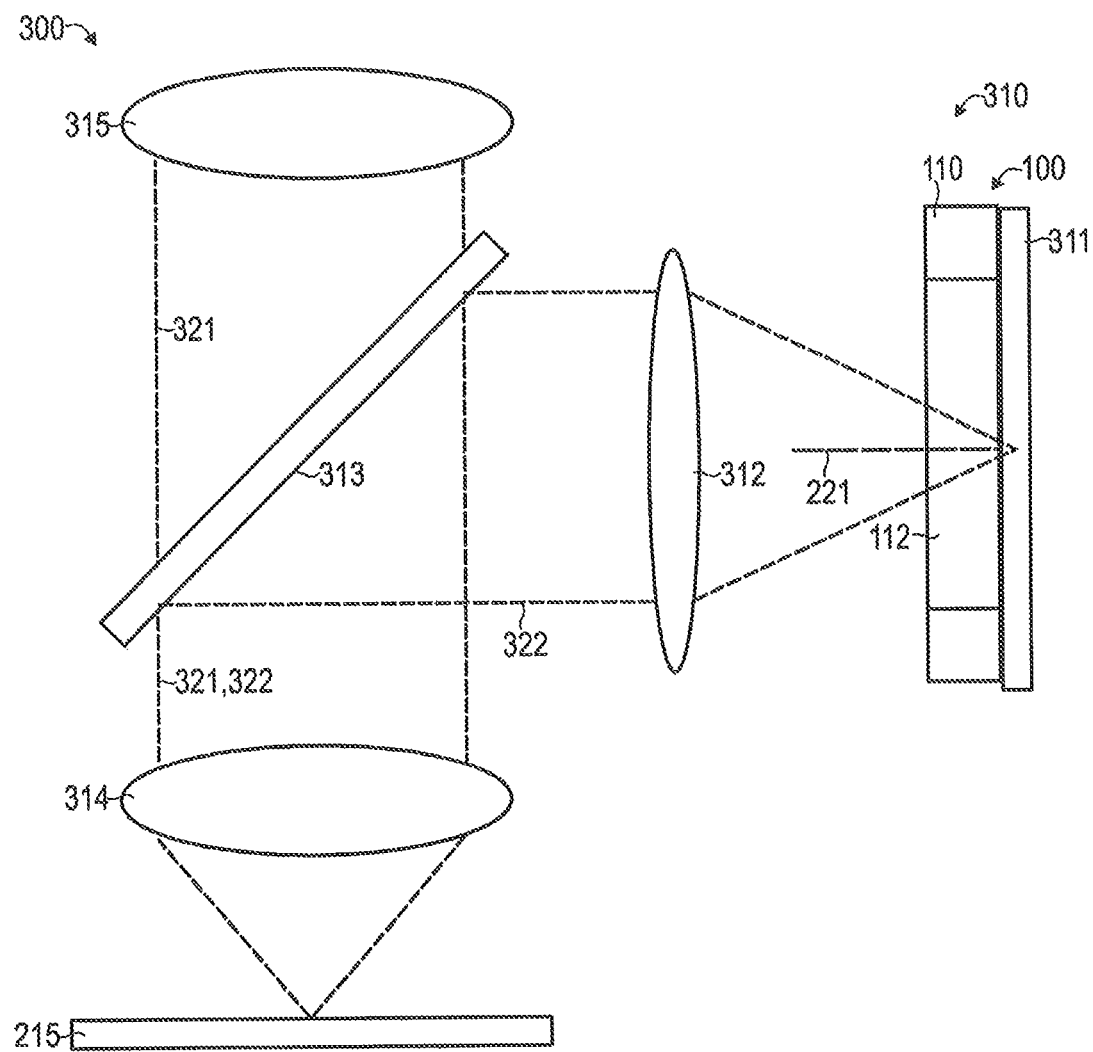
FIG. 9C schematically illustrates a microscope according to various embodiments, wherein the illumination module for angle-selective illumination is arranged in a beam path assigned to the camera and the camera is coupled to the illumination module.

FIG. 9C illustrates aspects in relation to a microscope 300. In principle, the microscope 300 of the example in FIG. 9C corresponds to the microscope 300 of the examples in FIGS. 8A-8C and 9A-9B. In the example in FIG. 9C, the illumination module 100 is combined with the camera 311. In this way, a particularly space-saving integration of the illumination module 100 can be ensured. By way of example, a sensor area of the camera 311 could be arranged adjacent to, or within, the light-transmissive region 112. By way of example, the camera 311 can be embodied with a secure connection to the illumination module 110.

The microscope 300 of FIGS. 8A, 8B, 8C, 9A, 9B, 9C, 10 could have a further illumination module. The latter could serve to illuminate the specimen object in the case of an observation through the eyepiece. By way of example, the further illumination source could have a collimator optical unit and a light source. However, it would also be possible for the illumination module 100 for illuminating the specimen object to be used during the observation through the eyepiece. To this end, for example, a plurality of light sources 111 could be operated at the same time in order to facilitate a uniform illumination of the specimen object.

Figure 10A:
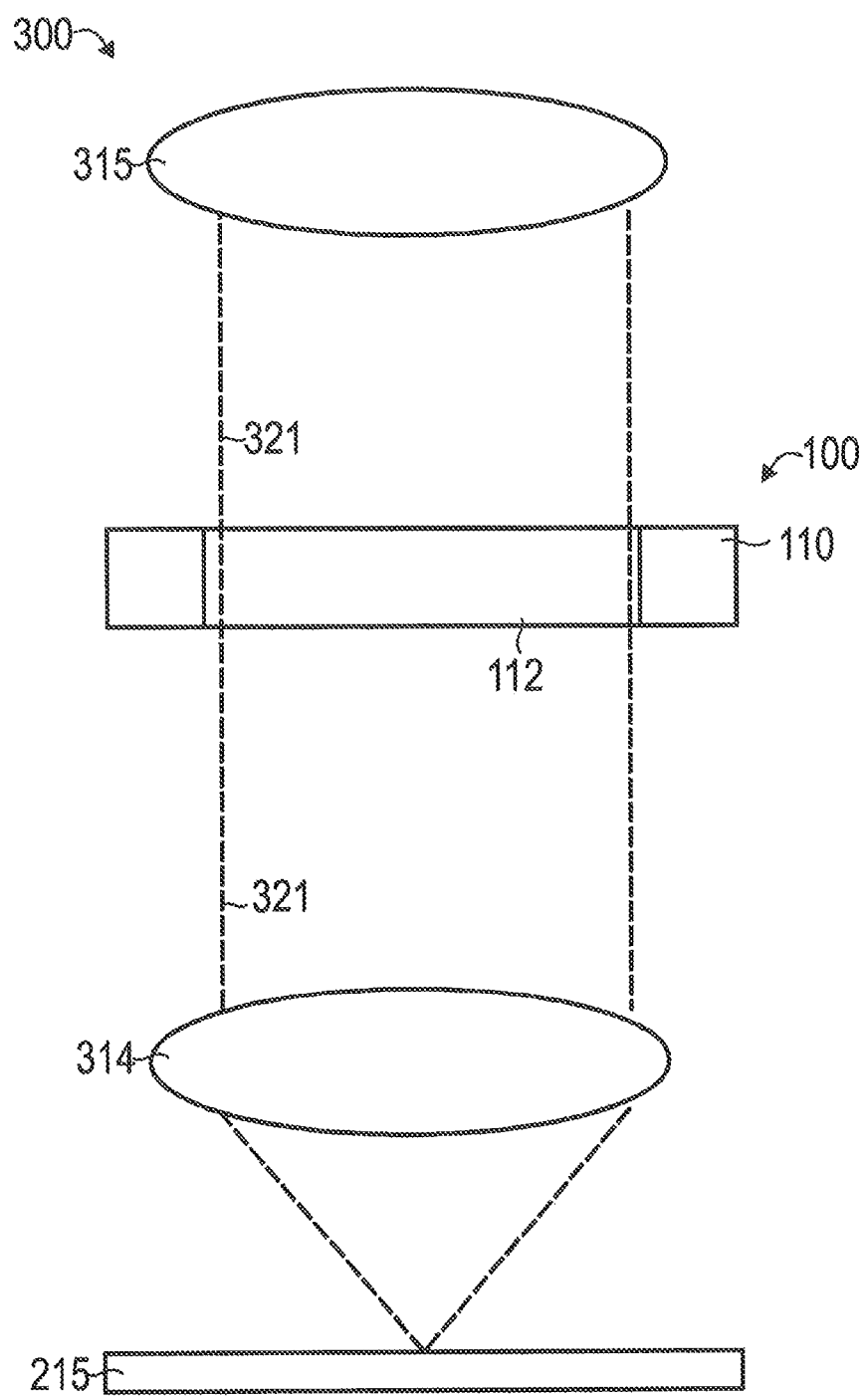
FIG. 10A schematically illustrates a microscope according to various embodiments, wherein the illumination module for angle-selective illumination is arranged in a detection beam path.

FIG. 10A illustrates aspects in, relation to a microscope 300. In principle, the microscope 300 of the example in FIG. 10A corresponds to the microscope 300 of the examples in FIGS. 8A-8C and 9A-9C. In the example of FIG. 10A, the illumination module 100 is arranged directly in the detection beam path 321 and it has an extent transversely to the detection beam path 321. This can ensure a particularly space-saving integration of the illumination module 100. There is no need to provide a separate further beam path 322.

Figure 10B:
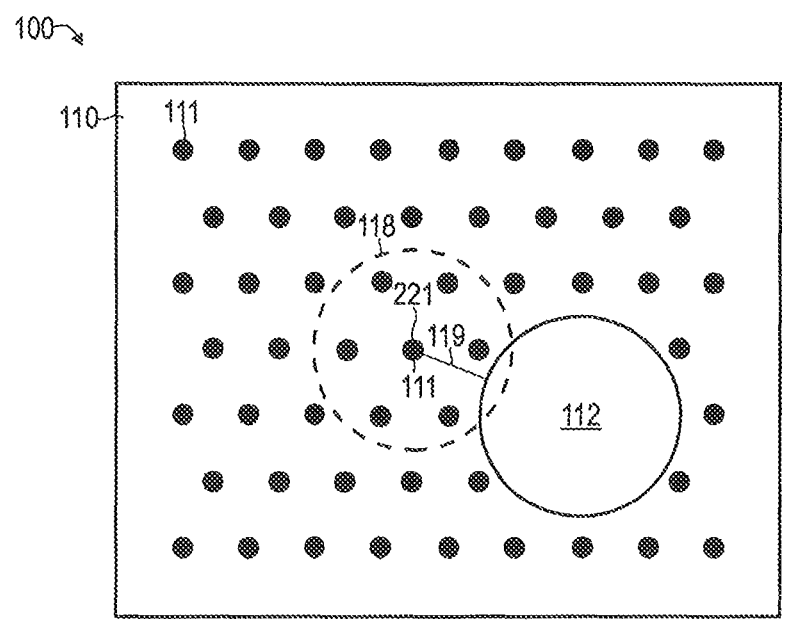
FIG. 10B schematically illustrates the illumination, module for angle-selective illumination and with the carrier and the plurality of light sources according to various embodiments, wherein the light-transmissive region is embodied as an aperture that is arranged on the carrier in off-centered fashion.

FIG. 10B illustrates aspects in relation to the illumination module 100. The illumination module 100 has a light-transmissive region 112, which is embodied as an aperture that is arranged in an off-centered fashion. Here, the aperture 112 has a distance 119 from the central axis 221, which may be coincident with a central ray of the respective beam path in the case of an arrangement of the illumination module 100 in an optical apparatus 200, 300.

An illumination module 100 according to the example in FIG. 10B may be desirable, in particular in relation to an arrangement of the illumination module 100 in the passed beam path 322 of an optical microscope 300, i.e., in relation to the detection beam path 321 downstream of the detector; see FIGS. 8A-8C. Then, direct light that, is produced by centrally arranged light sources 111—i.e., between the central axis 221 and the aperture 112—can be incident in the objective 314.

In the example in FIG. 10B, the distance 119 is selected to be so small that a projection 118 of the smallest aperture of the objective 314 on the carrier 110 (illustrated by the dashed line in FIG. 10B) has light sources 111 and the aperture 112 is arranged adjacently. As a result, bright-field imaging can be achieved.

While the example in FIG. 10B was discussed in relation to the light-transmissive region 112 implemented by an aperture, corresponding techniques can also be used in other examples for differently implemented light-transmissive regions.

Figure 11:
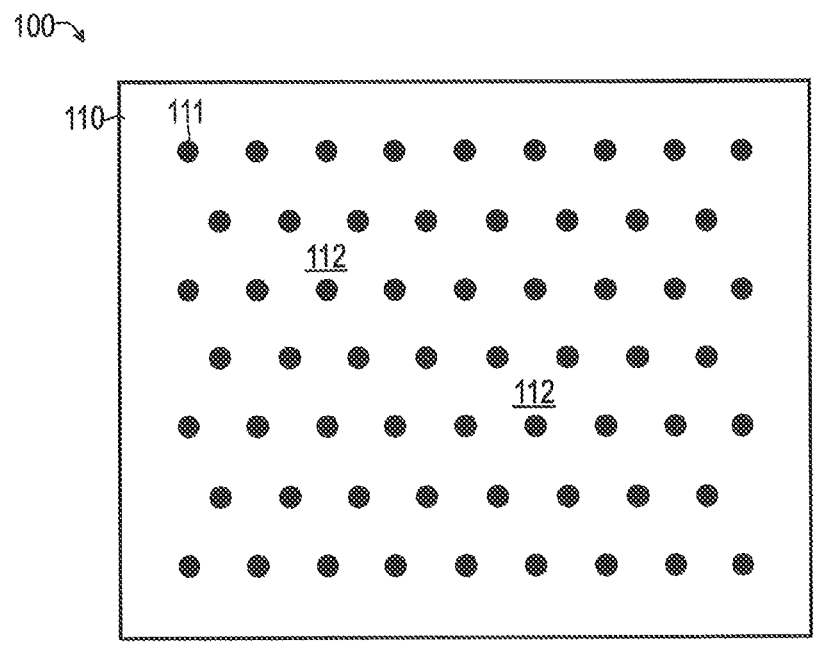
FIG. 11 schematically illustrates the illumination module for angle-selective illumination according to various embodiments, wherein the carrier of the illumination module is formed from light-transmissive material and the light sources of the illumination, module are arranged on the surface of the carrier with a low geometric fill factor.

FIG. 11 illustrates aspects in relation to the illumination module 100. FIG. 11 illustrates an example, in which the carrier 111 is formed from light-transmissive solid material. Then, interstices between the various light sources 111 implement the light-transmissive region 112.

In the example in FIG. 11, the light sources 111 are arranged in a matrix structure with a hexagonal unit cell. Other arrangements of the light sources 111 would also be possible, for example a matrix structure with a rectangular unit cell, etc., or an unordered arrangement.

In the example in FIG. 11, the light sources 111 are arranged on the upper side 110A of the carrier 110 (in the plane of the drawing in FIG. 11) with a comparatively low geometric fill factor of less than 30% (in FIG. 11, the geometric fill factor corresponds to the sum of the areas of all black regions relative to the overall area of the carrier 110). As a result of the comparatively low geometric fill factor, it is possible for a significant quantity of incident light to be able to pass through the carrier 110 of the illumination module 100 in the region of the interstices between the various light sources 111.

Figure 12:
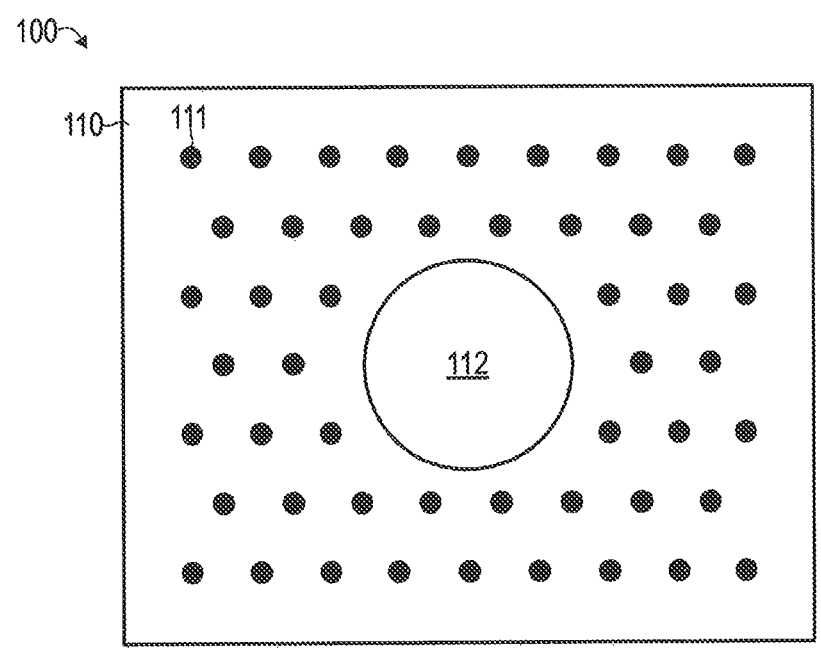
FIG. 12 schematically illustrates the illumination module for angle-selective illumination according to various embodiments, wherein the light-transmissive region of the illumination module is embodied as an aperture that is arranged centrally on the carrier.

FIG. 12 illustrates aspects in relation to the illumination module 100. FIG. 12 illustrates an example, in which the carrier 110 is produced from non-light-transmissive material, for example aluminum or a plastics material. In the example in FIG. 12, the light transmissive region 112 is formed by a centrally arranged aperture. By way of example, in the case of an arrangement of the illumination module 100 in a microscope or LSM, it may be possible for the space within the light-transmissive region 112/the aperture to remain free, or else for other optically effective elements, such as, e.g., a detector, a lens element, etc., to be arranged within the aperture.

While FIG. 12 shows an example in which the light-transmissive region 112 is arranged in a center of the carrier 110, the light-transmissive region 112 may also be arranged away from the center of the carrier 110 in other examples. In principle, it is not necessary either for the light-transmissive region 112 to have a symmetric form in relation to a central axis.

Figure 13:
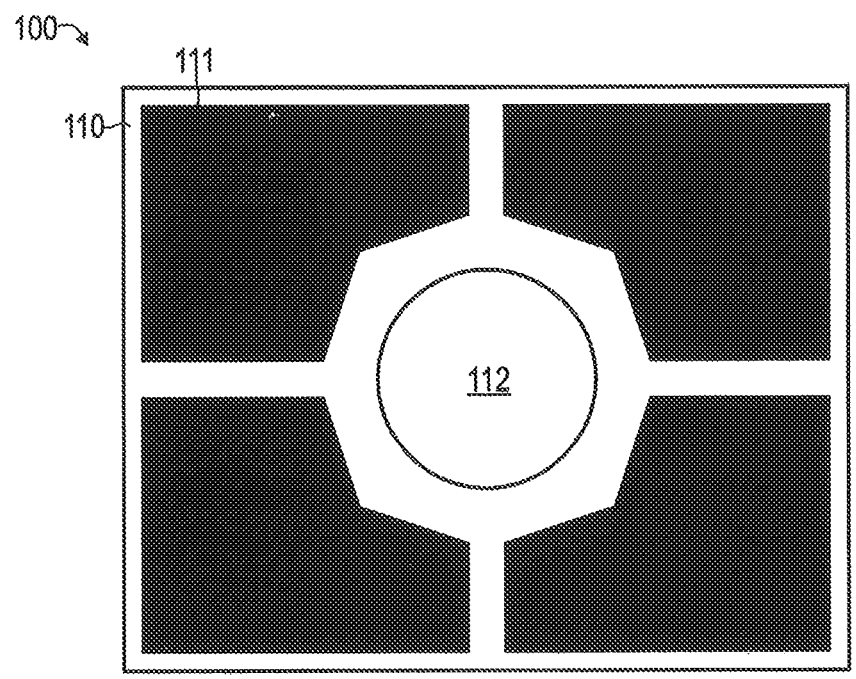
FIG. 13 schematically illustrates the illumination module for angle-selective illumination according to various embodiments, wherein the plurality of light sources of the illumination module are implemented by organic light-emitting diodes.

FIG. 13 illustrates aspects in relation to the illumination module 100. In FIG. 13, the various quadrants of the carrier 110 are occupied by laterally extended light sources 111. By way of example, the light sources 111 in the example of FIG. 13 can be implemented by way of organic light-emitting diodes. By means of such a configuration of the illumination module 100, illuminating the specimen object from extended solid angles may be possible.

Figure 14:
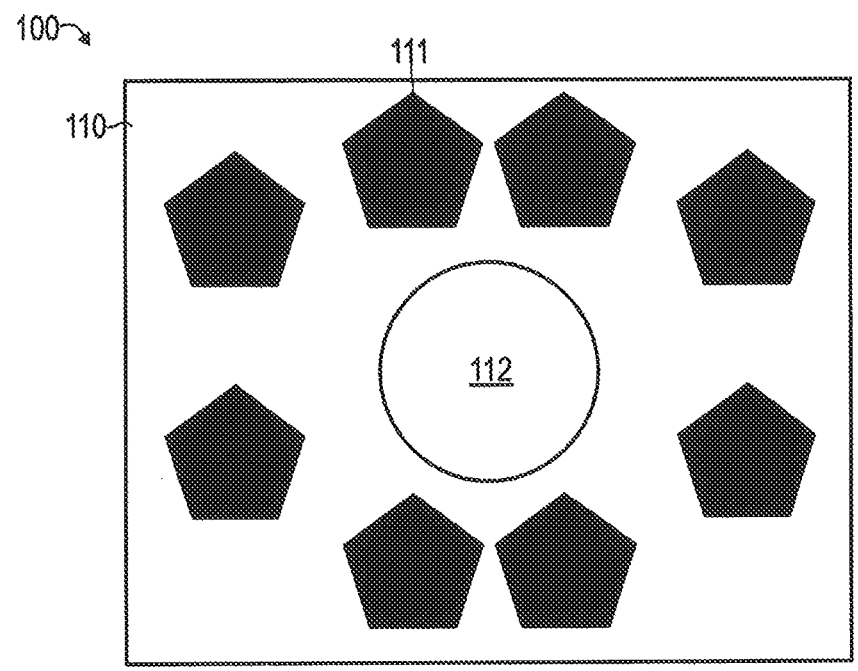
FIG. 14 schematically illustrates the illumination module for angle-selective illumination according to various embodiments, wherein the plurality of light sources are implemented by halogen light sources.

FIG. 14 illustrates aspects in relation to the illumination module 100. In FIG. 14, the various light sources 111 are embodied as halogen light sources. These are arranged symmetrically in relation to a central axis.

Figure 15:
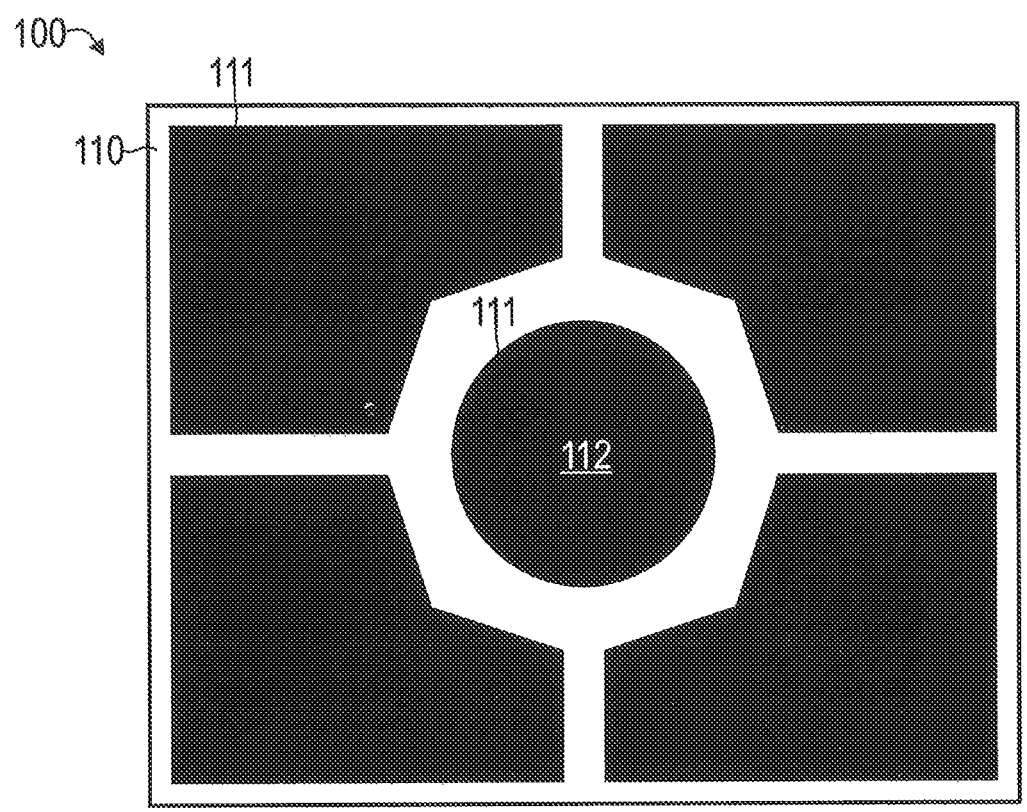
FIG. 15 schematically illustrates the illumination module for angle-selective illumination according to various embodiments, wherein the light-transmissive region and the plurality of light sources are implemented by organic light-emitting diodes.

FIG. 15 illustrates aspects in relation to the illumination module 100. In FIG. 15, the light-transmissive region 112 is implemented by light-transmissive organic light-emitting diodes 111. Here, the carrier 110 can be formed from non-light-transmissive material, for example.

From a comparison of FIGS. 10-15, it is clear that the configuration of the illumination module 100 can vary greatly in various examples. In particular, configurations, as illustrated in relation to FIGS. 10-15, may be combined with one another.

Figure 16:
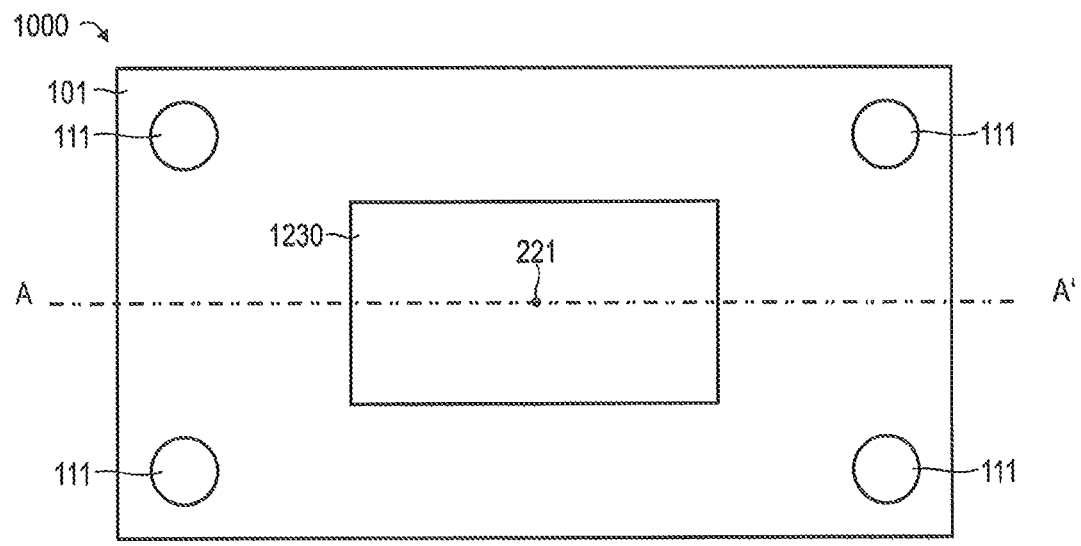
FIG. 16 is a schematic plan view of an illumination module for angle-selective illumination and with a carrier, on which a detector is attached according to various embodiments.

FIG. 16 illustrates aspects in relation to an illumination module 1000. The illumination module 1000 according to the example of FIG. 16 corresponds, in principle, to the illumination module 100 according to the example of FIG. 1. Here, the carrier 101 of the illumination module 1000—in contrast to the example in FIG. 1—has no light-transmissive region. A detector 1230 is attached to the carrier 101 in the example of FIG. 16. By way of example, the detector 1230 can be attached to the upper side 110A of the carrier 101; see FIG. 17. Then, the sensor area 1231 is at a distance from the surface 110A. By way of example, the detector 1230 can be adhesively bonded, screwed or fastened differently to the carrier 101.

Figure 17:
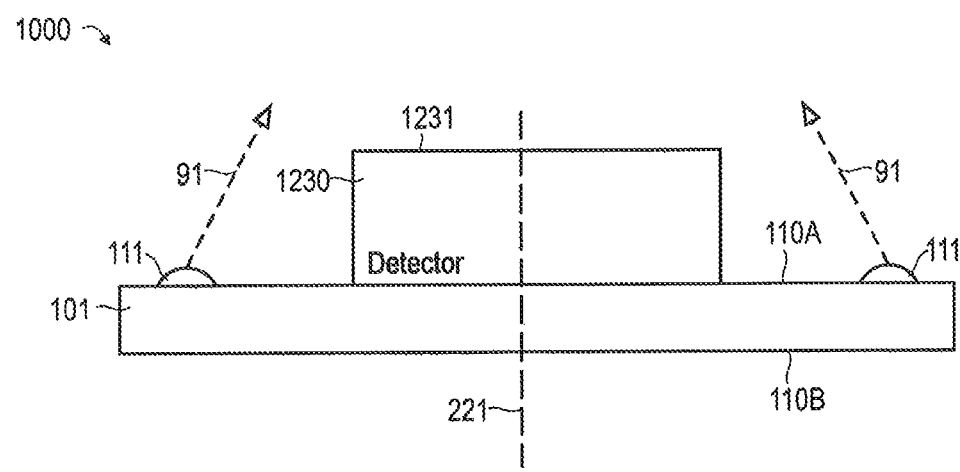
FIG. 17 is a schematic side view of the illumination module for angle-selective illumination according to FIG. 16.

In the examples in FIGS. 16 and 17, the detector 1230 is arranged centrally on the carrier 101. In particular, this means that the detector 1230 is arranged centrally in relation to the axis 221. In various examples, it would also be possible, however, for the detector 1230 to be arranged on the carrier 101 in off-centered fashion. By way of example, it would be possible for different techniques, which were described above in relation to FIG. 10B, to be applied in relation to the detector 1230. Thus, it would be possible for the detector 1230 to have a distance from the center of the carrier 110, with at least one of the light sources 111 of the illumination module 100 being arranged between the center of the carrier 110 and the detector 1230. Once again, the distance between the detector 1230 and the center of the carrier 110 can correspond to a projection 118 of the aperture of the objective 314 on the carrier 110. This can promote bright-field illumination.

In the examples in FIGS. 16 and 17, the module 1000 in each ease has a single detector 1230. However, it would be possible in the various examples for the module 1000 to have more than a single detector, for example two or three detectors. Here, the plurality of detectors can be attached at a distance from one another on the carrier 101. By way of example, the plurality of detectors 1230 could be attached to different sides of the axis 221 or in different quadrants in relation to the axis 221.

Figure 18:
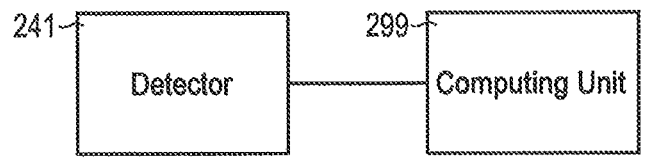
FIG. 18 schematically illustrates an optical apparatus according to various embodiments with a detector and a computing unit.

FIG. 18 is a schematic illustration of the optical apparatus 200, 300, which is configured for angle-selective illumination according to various examples described herein. The optical apparatus 200, 300 has the detector 241, which detects light that is emitted from the light sources 111 of the illumination module 110. The optical apparatus 200, 300 also has a computing unit 299. The computing unit 299 is configured to actuate the illumination module 100 or the light sources 111 for separate and/or sequential illumination of the specimen object from a plurality of illumination directions. To this end, different light sources 111 can be activated separately and/or in sequence, for example. Furthermore, for each illumination direction, the computing unit 299 is configured to actuate the detector 241 for capturing a respective measurement image of the object. Furthermore, the computing unit 299 is configured to combine the measurement images to obtain a result image. The result image has a phase contrast. Here, the computing unit 299 can be configured to apply techniques of digital post-processing, which are disclosed in relation to DE 10 2014 112 242 A1.

Figure 19:
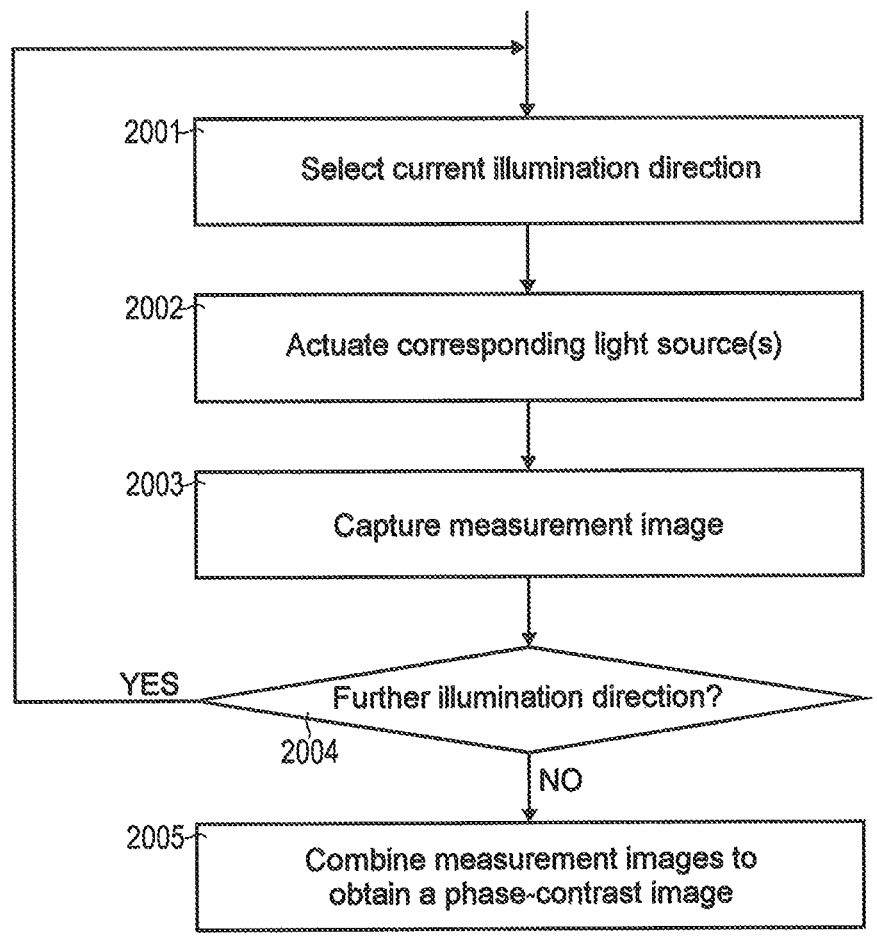
FIG. 19 is a flowchart of a method according to various embodiments.

FIG. 19 is a flowchart of a method according to various examples. By way of example, the computing unit 299 could be configured to carry out the method according to FIG. 19.

initially, a current illumination directions 91 are selected in step 2001. Then, one or more light sources 111 are activated in step 2002 such that the illumination of a specimen object is obtained from the selected illumination directions. An associated measurement image is captured in step 2003, for example by means of a suitable detector 241, for example by means of a CCD detector or a CMOS detector, an overview camera and/or a photomultiplier. To this end, the detector 241 can be actuated in a suitable manner. The measurement image is captured while the specimen object is illuminated from the current illumination directions.

Then, a check is carried out in step 2004 as to whether it is necessary to capture a further measurement image from a further illumination direction 91. If this is the case, steps 2001-2003 are carried out again.

Subsequently, a result image is produced in step 2002. The result image has a phase contrast for an imaged object (phase-contrast image). The phase-contrast image is determined by combining the measurement images, which were captured in the iterations of step 2003.

While the measurement images typically have no, or no significant, phase-contrast, it is possible to produce the phase-contrast image by combining the measurement images, said phase-contrast image having a significant phase-contrast component. Particularly in comparison with other conventional techniques of phase-contrast imaging, the method described in the present case can obtain the effect of a particularly simple implementation of the phase-contrast imaging on the one hand and the effect of a particularly simple, and hence cost effective and robust, configuration of the optical apparatus on the other hand.

By way of example, it would be possible for the illumination directions to form pairs in each case or to be arranged in pair-wise fashion. Here, it may be possible for an illumination direction always to be assigned to only one pair. However, it would also be possible for at least some of the illumination directions to be assigned to a plurality of pairs. At least the measurement images of the illumination directions belonging to one pair can then be combined to obtain a respective result image.

Different criteria for the assignment of two illumination directions 91 to a pair may apply. By way of example, geometric criteria of the illumination directions 91 of a pair may apply, for instance in relation to the optical axis; in this way, it may be possible to produce a particularly high phase-contrast component in the phase-contrast image, for example. By way of example, the illumination directions of a pair could be included symmetrically in relation to the axis of the optical apparatus along which an idealized light ray experiences no, or only little, deflection (optical axis) and/or be arranged symmetrically in relation to a plane containing the optical axis. However, as an alternative or in addition thereto, it would also be possible to take account of a time of illumination and capture as an alternative or additional criterion of the belonging of two illumination directions 91 to a pair; by way of example, those illumination directions 91, for which the respective measurement image is captured immediately in succession or successively in a timely fashion, can form a pair; in this way, a certain robustness in relation to movement artifacts could be obtained, for example. In general, a subsequent evaluation for producing the phase-contrast image can also be taken into account as an alternative or additional criterion for the belonging of two illumination directions 91 to a pair; by way of example, an individual result image could always be produced for the two measurement images of a pair by combining these measurement images.

It would be possible for the two illumination directions 91 of a pair to include correlating angles with the optical axis. By way of example, correlating angles can mean: substantially the same angles or substantially the same angles in terms of magnitude; substantially can be characterized, in particular, in relation to technical limitations in the accuracy, such as, e.g., systematic or statistical errors when capturing the measurement images by the optical apparatus and/or a limitation of an illumination apparatus of the optical apparatus caused by the construction thereof. To the extent that angles which, although they are different in absolute terms, are the same within the accuracy of the optical apparatus, for example, are implemented, this can satisfy such a criterion of substantially the same angles. Such criteria apply below to corresponding specifications of angles and/or other properties of illumination directions 91 or of the optical apparatus.

For the purposes of describing geometric properties of the illumination directions, it may be helpful to describe the illumination directions 91 by way of an illumination vector. The illumination vectors can be defined in relation to an origin of the optical apparatus, for instance in relation to the object and/or an intersection of a focal plane with the optical axis. A length of the illumination vectors can correspond to an amplitude of the illumination from the respective illumination direction, for example; in the subsequent explanation of the orientation of various illumination vectors, it may be possible to dispense with taking account of a length of the illumination vectors. Then, the angle included by an illumination vector with the optical axis may correspond to the angle of the respective illumination direction.

By way of example, it may be desirable for illumination vectors of a pair of illumination directions to include an angle with one another, said angle being greater than 10°, preferably greater than 20°, particularly preferably greater than 40°. As an alternative or in addition thereto, it would also be possible for illumination vectors of a pair of illumination directions to each include an angle with the optical axis, said angle being greater than 5°, preferably greater than 10°, particularly preferably greater than 20°. What this can achieve is that a difference vector between the two illumination vectors of a pair of illumination directions 91 has a significant component perpendicular to the optical axis; this can increase the phase contrast in the phase-contrast image particularly strongly.

In particular, it may be possible for the illumination vectors of two illumination directions of a pair of illumination directions to be transformed into one another by rotation about the optical axis of the optical apparatus through an angle of greater than 25°, preferably greater than 50°, particularly preferably greater than 85°. As a result of this, the difference vector becomes particularly large.

The two illumination directions of a pair of illumination directions can also be arranged in such a way that associated illumination vectors include with one another, by way of rotation about the optical axis through an angle of 160° to 200°, advantageously of 175° to 185°, particularly advantageously of 180°. It would also be possible for the associated illumination, vectors to be transformed into one another by way of rotation about the optical axis through an angle of 70° to 110°, advantageously of 85° to 95°, particularly advantageously of 90°. Expressed differently, the two illumination vectors of a pair of illumination directions 91 can lie in a plane and can be arranged symmetrically or substantially symmetrically in relation to the optical axis. The optical axis can lie in this plane (be contained in this plane), for example, if a rotation through 180° transforms the two illumination vectors into one another. In this way, a comparatively large phase-contrast component can be obtained in the phase-contrast image because the two illumination directions of a pair are arranged in complementary fashion to one another in this way.

In general, it may be desirable to use a relatively large number of illumination directions for the purpose of obtaining the phase-contrast image. In particular, the phase-contrast component in the phase-contrast image can increase in the case of an appropriate arrangement of the various illumination directions 91. By way of example, it would be possible to take account of a plurality of pairs of illumination directions. By way of example, it would be possible to illuminate the object sequentially from 2 or 4 or 6 or 8 illumination directions or more illumination directions. By way of example, it would be possible for a first pair of illumination directions to determine a first difference vector of associated illumination vectors. Accordingly, a second pair of illumination directions can determine a second difference vector of associated illumination vectors, The first and second difference vector can include an angle with one another, for example an angle of 70° to 110°, advantageously 85° to 95°, particularly advantageously b 90°.

Accordingly, it would also be possible for a first plane to be defined by the illumination vectors of a first pair of illumination directions 91. By way of example, a second plane can be defined by the illumination vectors of a second pair of illumination directions, The first plane and the second plane can include an angle, for example an angle of 70° to 110°, with one another, advantageously 85° to 95°, particularly advantageously 90°. By way of example, the planes can be defined by virtue of the respective illumination vectors lying in the plane. It would also be possible for the planes to be defined by a normal vector that is oriented parallel to a difference vector of the respective illumination vectors: the optical axis can lie in the plane.

Thus, in this way, difference vectors of the illumination vectors of the two pairs of illumination directions 91 can include a comparatively large angle of up to 90° with one another; as a result, the phase-contrast in the phase-contrast image can be increased along various image directions. By way of example, a phase-contrast component in the phase-contrast image can be particularly large along those image directions for which the illumination vectors of a pair of illumination directions have a component perpendicular to the optical axis. In particular, a phase-contrast component in the phase-contrast image can be particularly large along those directions for which the difference vector of the illumination vectors of a pair of illumination directions has a component perpendicular to the optical axis. Therefore, it may be desirable to use complementary and/or symmetrically arranged illumination directions. In order to produce an isotropic phase contrast in the phase-contrast image, it may be desirable for the illumination directions to include uniformly distributed angles with the optical axis.

Such illumination directions 91, or illumination vectors as described above, can be implemented by suitable arrangement and/or extent of the light sources 111 on the carrier 101.

In conclusion, techniques in relation to illumination modules for angle-selective illumination are described above. Such techniques render it possible to combine the angle-selective illumination flexibly with various optical apparatuses.

It goes without saying that the features of the embodiments and aspects of the invention described above can be combined with one another. In particular, the features can be used not only in the combinations described but also in other combinations or on their own without departing from the scope of the invention.

While various examples are described above in relation to an LSM and in relation to a microscope with an eyepiece, it is also possible to use corresponding techniques for other optical apparatuses in other examples. In particular, the illumination modules with carrier and light-transmissive region, as described herein, can also be used for other optical apparatuses.

While various examples are described above in relation to fluorescence imaging, corresponding techniques can also be used for other types of imaging. This may mean that use can be made of other detectors which, for example, are not suitable for detecting a fluorescence signal.

While various examples are described above in relation to an illumination module with a carrier, which has a light-transmissive region, corresponding techniques can also be applied to a carrier that has no light-transmissive region in some examples.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A laser scanning microscope, comprising:
   a first illumination module with a laser light source;
   a second illumination module with a carrier and with a plurality of light sources, which are arranged on the carrier;
   a specimen holder, which is configured to immobilize a specimen object in a beam path defined by the laser light source;
   a detector, which is suitable for detecting a fluorescence signal of the specimen object, wherein the second illumination module is arranged downstream of the specimen holder or upstream of the specimen holder in relation to the first illumination module;
   a scanning optical unit;
   an objective; and
   wherein the scanning optical unit and the objective are arranged upstream of the specimen holder in relation to the first illumination module and in the beam path; and
   wherein the second illumination module is arranged such that one or more light sources of said second illumination module are arranged centrally so that light therefrom illuminates said specimen object, which light then penetrates directly into the objective after being collected from the specimen object.

2. The laser scanning microscope as claimed in claim 1, wherein the carrier has at least one light-transmissive region, and
   wherein the at least one light-transmissive region is embodied as an aperture that is arranged centrally on the carrier and/or arranged on the carrier in off-centered fashion.

3. The laser scanning microscope as claimed in claim 2, furthermore comprising:
   a detector, which is at least partly arranged in the aperture.

4. The laser scanning microscope as claimed in claim 1, wherein the second illumination module is arranged between the scanning optical unit and the objective in the beam path or in the beam path in mirrored-in fashion.

5. The laser scanning microscope as claimed in claim 3, wherein a detection spectrum of the detector is at least partly different from an emission spectrum of the light sources of the second illumination module.

6. The laser scanning microscope as claimed in claim 3, further comprising:
a further detector, having a detection spectrum which at least partly overlaps with an emission spectrum of the light sources of the second illumination module.

* * * * *